US009003286B2

(12) United States Patent
Myers et al.

(10) Patent No.: US 9,003,286 B2
(45) Date of Patent: Apr. 7, 2015

(54) SYSTEM AND METHOD FOR PROVIDING BROADCAST LISTENER PARTICIPATION

(75) Inventors: Theodore N. Myers, Fort Collins, CO (US); Kevin R. Lockhart, Ogallala, NE (US); Jeffrey D. Zigler, Omaha, NE (US); Alan L. Sledge, Scottsdale, AZ (US); Richard D. Wooden, Ogallala, NE (US); Jacqueline J. Lockhart, Poway, CA (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 356 days.

(21) Appl. No.: 13/184,701

(22) Filed: Jul. 18, 2011

(65) Prior Publication Data

US 2011/0271189 A1    Nov. 3, 2011

Related U.S. Application Data

(63) Continuation of application No. 12/231,069, filed on Aug. 28, 2008.

(60) Provisional application No. 60/968,710, filed on Aug. 29, 2007.

(51) Int. Cl.
G06F 17/30        (2006.01)
H04H 20/38        (2008.01)
H04H 60/06        (2008.01)

(52) U.S. Cl.
CPC ........... *G06F 17/3089* (2013.01); *H04H 20/38* (2013.01); *H04H 60/06* (2013.01)

(58) Field of Classification Search
USPC ....................................................... 715/716
See application file for complete search history.

(56) References Cited

U.S. PATENT DOCUMENTS

| | | | |
|---|---|---|---|
| 6,587,127 B1* | 7/2003 | Leeke et al. .................. 715/765 |
| 2002/0032019 A1* | 3/2002 | Marks et al. .................. 455/414 |
| 2002/0059649 A1* | 5/2002 | Ichioka ......................... 725/153 |
| 2002/0194607 A1* | 12/2002 | Connelly ........................ 725/87 |
| 2003/0093790 A1 | 5/2003 | Logan et al. |
| 2003/0217170 A1 | 11/2003 | Nelson et al. |
| 2005/0197961 A1 | 9/2005 | Miller et al. |
| 2006/0015925 A1 | 1/2006 | Logan |
| 2006/0184977 A1* | 8/2006 | Mueller et al. .................. 725/86 |
| 2006/0212444 A1* | 9/2006 | Handman et al. ................. 707/5 |
| 2006/0212900 A1* | 9/2006 | Ismail et al. ..................... 725/34 |
| 2006/0218187 A1 | 9/2006 | Plastina et al. |
| 2008/0155588 A1 | 6/2008 | Roberts |

FOREIGN PATENT DOCUMENTS

WO    PCT/US08/10192    11/2008

* cited by examiner

*Primary Examiner* — Shyue Jiunn Hwa
(74) *Attorney, Agent, or Firm* — Garlick & Markison; Edward J. Marshall

(57) ABSTRACT

A method of allowing listeners to participate in broadcast programming is provided, the method generally comprising one or more of providing a library of media elements accessible by a plurality of listeners; receiving from each of at least two of the listeners a playlist of media elements, wherein at least one of the media elements in each playlist is from the library of media elements; editing the playlists using broadcast scheduling software; providing the edited playlists to the plurality of listeners for playback, and for feedback regarding the playlists; and receiving feedback from at least one of the listeners regarding the playlists. A system and apparatus are similarly provided.

26 Claims, 22 Drawing Sheets

Djdreamer FAQs

Djdreamer FAQs

[ Login | Create Your Hour | Rate Others | FAQs | About Djdreamer ]

Djdreamer FAQS

How do I sign up for Djdreamer?
Just answer a few questions and you are ready to become a D.J. Get Started How many times can I win?
Each week new winners are selected, just depends on how good you are.

How do you pick the winners?
Our panel of judges will select 5 to 10 finalists.

How do I vote for other hours?
Once you have signed up you can view and vote on other members radio hour. Vote When will I find out if I won?
An email will be sent with information on how you can claim your prize.

When will my hour be played?
The finalists hours will play on the station during on the weekend or overnight hours.

How often can I submit a programmed hour?
New contests start every Monday.

View Djdreamer Quick Start Guide

| Station Music | Station ID's | Station Bits | Other |

| Title 173 | Artist 174 | Time 175 |
|---|---|---|
| I've Seen All Good People | Yes | 4:23 |
| Roundabout | Yes | 5:07 |
| Cinnamon Girl | Neil Young | 3:45 |
| Rockin' in the Free World | Neil Young | 3:10 |
| Southern Man | Neil Young | 3:39 |
| Legs | ZZ Top | 3:59 |
| Sharp Dressed Man | ZZ Top | 4:46 |
| TV Dinner | ZZ Top | 3:05 |

Select — 172

170

Program Log # 1234567  Save — 176
Total Run Time 20:09
Time to Fill 39:51

| Barracuda | 3:49 | ♪ |
| Heart | | |
| "Coming up this hour..." | 0:13 | 🎤 |
| DJ Intro | | |
| Comfortably Numb | 3:58 | ♪ |
| Pink Floyd | | |
| Bohemian Rhapsody | 4:28 | ♪ |
| Queen | | |
| "It's Miller Time, on KGB" | 0:07 | ⓘ ID |
| Steve Miller ? ID | | |
| Fly Like An Eagle | 4:14 | ♪ |
| Steve Miller Band | | |
| Rockin' in The Free World | 3:10 | ♪ |
| Neil Young | | |

Program Log # 1234567

| Total Run Time | 60:07 | Start |
| Total Music Time | 59:35 | Time |

| | | |
|---|---|---|
| Barracuda | /Heart | 00:00 |
| "Coming up this hour..." | /DJ Intro | 03:49 |
| Comfortably Numb | /Pink Floyd | 04:92 |
| Bohemian Rhapsody | /Queen | 08:30 |
| "It's Miller Time, KGB | /Steve Miller / ID | 12:38 |
| Fly Like An Eagle | /Steve Miller Band | 12:45 |
| Rockin' in the Free Wo | /Neil Young | 16:59 |
| Cult of Personality | /Living Colour | 20:57 |
| Holiday | /Scorpions | 25:35 |
| Heartbreaker | /PatBenatar | 29:24 |
| "Shut up and rock, KGB"/Segue | | 32:52 |
| Let There Be Rock | /AC / DC | 32:57 |
| Dream On | /Aerosmith | 36:21 |
| "Classic Zep, going on... | /DJ Dedication | 40:22 |
| Stairway to Heaven | /Led Zeppelin | 40:29 |
| Here I Go Again | /Whitesnake | 46:53 |
| Children Of The Sun | /Billy Thorpe | 51:48 |
| Cuts Like A Knife | /Bryan Adams | 56:38 |

| Number of songs in this hour | 14 |
| Calculated Core Point Total | 120.4 |
| Calculated Core Point Average | 89.5 |

180

181  182  183  184  185
 1    2    3    4    5 Best

187    Clear    Submit Voting Ballot    186

© 2007-2008 Clear Channel Management Services, L.P.

| | | | | | | | | |
|---|---|---|---|---|---|---|---|---|
| 03 | 013206 | HERO | 03:08 | 03 | 06 | 01 | 07 | 02 |
| 03 | 067989 | DON'T MESS WITH MY HEART | 01:05 | 03 | 06 | 01 | 07 | 02 |
| 03 | 5DB598A2 | KSME Creely Fort Collins Lowel | 00:01 | 03 | 06 | 01 | 07 | 02 |
| 03 | DJCHAT | DJ Chat Programmed | 00:20 | 03 | 06 | 01 | 07 | 02 |
| 03 | 280712 | CUPID'S CHOKEHOLD | 03:59 | 03 | 06 | 01 | 07 | 02 |
| 03 | 338108 | SMILE | 03:14 | 03 | 06 | 01 | 07 | 02 |
| 03 | 048874 | BE WITHOUT YOU | 04:07 | 03 | 06 | 01 | 07 | 02 |
| 03 | 22B539DD | 96.1 Broadcasting in HD | 00:11 | 03 | 06 | 01 | 07 | 02 |
| 03 | 012576 | ONE WEEK | 00:00 | 03 | 06 | 01 | 07 | 02 |
| 03 | DJCHAT | DJ Chat Programmed | 00:20 | 03 | 06 | 01 | 07 | 02 |
| 03 | 280934 | RUNAWAY LOVE | 01:08 | 03 | 06 | 01 | 07 | 02 |
| 03 | 048995 | HOW TO SAVE A LIFE | 01:22 | 03 | 06 | 01 | 07 | 02 |
| 03 | 066433 | SUGAR (GIMME SOME) | 00:00 | 03 | 06 | 01 | 07 | 02 |
| 03 | 7055C8F | We got a website | 00:15 | 03 | 06 | 01 | 07 | 02 |
| 03 | 280687 | ICE BOX | 01:02 | 03 | 06 | 01 | 07 | 02 |
| 03 | 034970 | WHERE IS THE LOVE | 03:49 | 03 | 06 | 01 | 07 | 02 |
| 03 | 066433 | SUGAR (GIMME SOME) | 00:00 | 03 | 06 | 01 | 07 | 02 |
| 03 | 281015 | KEEP HOLDING ON | 04:01 | 03 | 06 | 01 | 07 | 02 |
| 03 | 280324 | IRREPLACEABLE | 03:17 | 03 | 06 | 01 | 07 | 02 |
| 03 | 039121 | JUMPIN JUMPIN | 03:13 | 03 | 06 | 01 | 07 | 02 |
| 03 | 049961 | LET'S GET IT STARTED | 03:39 | 03 | 06 | 01 | 07 | 02 |
| 03 | E6659219 | KISS FM | 00:01 | 03 | 06 | 01 | 07 | 02 |
| 03 | DJUpload | Voice Track | 00:20 | 03 | 06 | 01 | 07 | 02 |
| 03 | 261665 | INTO THE OCEAN | 04:00 | 03 | 06 | 01 | 07 | 02 |
| 03 | 339454 | LEAVE THE PIECES | 03:30 | 03 | 06 | 01 | 07 | 02 |
| 03 | 062378 | BECAUSE OF YOU | 03:40 | 03 | 06 | 01 | 07 | 02 |
| 03 | 260419 | NOTHING LEFT TO LOSE | 04:20 | 03 | 06 | 01 | 07 | 02 |

| SongID | Average Of Votes | Number Of Votes | Title | Artist |
|--------|------------------|-----------------|-------|--------|
| 078445 | 5.00 | 1 | OUTTA CONTROL (REMIX) | 50 CENT/MOBB DEEP |
| 281015 | 5.00 | 3 | BELLY DANCER | AKON |
| 282261 | 5.00 | 1 | CHECK ON IT | BEYONCE/SLIM THUG |
| 280328 | 4.00 | 1 | LET'S GET IT STARTED | BLACK EYED PEAS/FERGIE |
| 282589 | 4.00 | 2 | BE WITHOUT YOU | MARY J BLIGE |
| 084747 | 4.00 | 2 | ALMOST | BOWLING FOR SOUP |
| 261966 | 4.00 | 2 | ON THE WAY DOWN | RYAN CABRERA |
| 261966 | 3.50 | 1 | ON THE WAY DOWN | RYAN CABRERA |
| 280705 | 3.50 | 1 | 1-2 STEP | CIARA/MISSY ELLIOT |
| 017794 | 3.00 | 1 | BECAUSE OF YOU | KELLY CLARKSON |
| 030943 | 3.00 | 1 | BEHIND THESE HAZEL EYES | KELLY CLARKSON |
| 078446 | 3.00 | 2 | SUGAR (GIMME SOME) | TRICK DADDY |
| 280682 | 3.00 | 1 | I DON'T WANT TO BE | GAVIN DEGRAW |

1 2 3

SYSTEM AND METHOD FOR PROVIDING BROADCAST LISTENER PARTICIPATION

CROSS REFERENCE TO RELATED PATENTS

This application is a continuation of U.S. application Ser. No. 12/231,069, filed Aug. 28, 2008, and entitled "SYSTEM AND METHOD FOR PROVIDING BROADCAST LISTENER PARTICIPATION," which itself claims priority to U.S. Provisional Application No. 60/968,710, filed on Aug. 29, 2007, the disclosure of which are incorporated herein by reference.

COPYRIGHT NOTICE

This application contains material that is subject to copyright protection. Such material may be reproduced by any person exactly as it appears in the Patent and Trademark Office patent files or records. The copyright owner otherwise reserves all rights to such material.

FIELD

This application generally relates to information technology in the field of radio broadcasting, and more particularly to interactive radio broadcasting.

BACKGROUND

In the field of radio broadcasting, present broadcast scheduling technology is not utilized to its full potential. For example, listeners are not able interact with broadcasters to create, hear and rate broadcasting playlists. Therefore, there is a need in the art for a system and method for providing listener participation of that sort.

BRIEF DESCRIPTION OF THE DRAWINGS

FIG. 2 depicts an embodiment of a screen for a listener to register for access to a listener participation interface that may be provided by the exemplary listener participation software.

FIG. 6 depicts a display that may be provided by the exemplary listener participation software of a playlist that may be created by use of the interfaces of FIGS. 4-5.

FIG. 8 depicts an embodiment of an interface that may be provided by the exemplary listener participation software for a listener to rate a plurality of playlists that have been created and submitted.

FIG. 9 depicts one embodiment of an interface that may be provided by the exemplary listener participation software for providing frequently asked questions and answers regarding a playlist contest.

FIG. 11 depicts another embodiment of an interface that may be provided by the exemplary listener participation software for previewing, listening to, and rating one or more playlists.

FIG. 12 depicts another embodiment of an interface that may be provided by the exemplary listener participation software for defining and creating a playlist from a selection of media elements.

FIG. 13 depicts another alternative embodiment of an interface that may be provided by the exemplary listener participation software for a listener to rate and preview a playlist that has been created and submitted.

FIG. 14 depicts an embodiment of an interface that may be provided by the exemplary listener participation software for a radio broadcaster to manage and edit a playlist that has been submitted.

FIG. 15 depicts an embodiment of an interface that may be provided by the exemplary listener participation software for a radio broadcaster to incorporate a plurality of playlists into a radio broadcast.

FIG. 16 depicts another embodiment of an interface that may be provided by the exemplary listener participation software for a radio broadcaster to incorporate a plurality of playlists into a radio broadcast and export that information into its broadcast automation software.

FIG. 17 depicts a time-based log of media elements that have been created by incorporating one or more playlists created by listeners into a radio broadcast.

FIG. 21 depicts an embodiment of an interface that may be provided by the exemplary listener participation software for viewing, listening to, and rating a plurality of songs.

FIG. 22 depicts an embodiment of an interface that may be provided by the exemplary listener participation software for a radio broadcaster to access the ratings submitted through the interface of FIG. 21.

DETAILED DESCRIPTION

Figure 1:
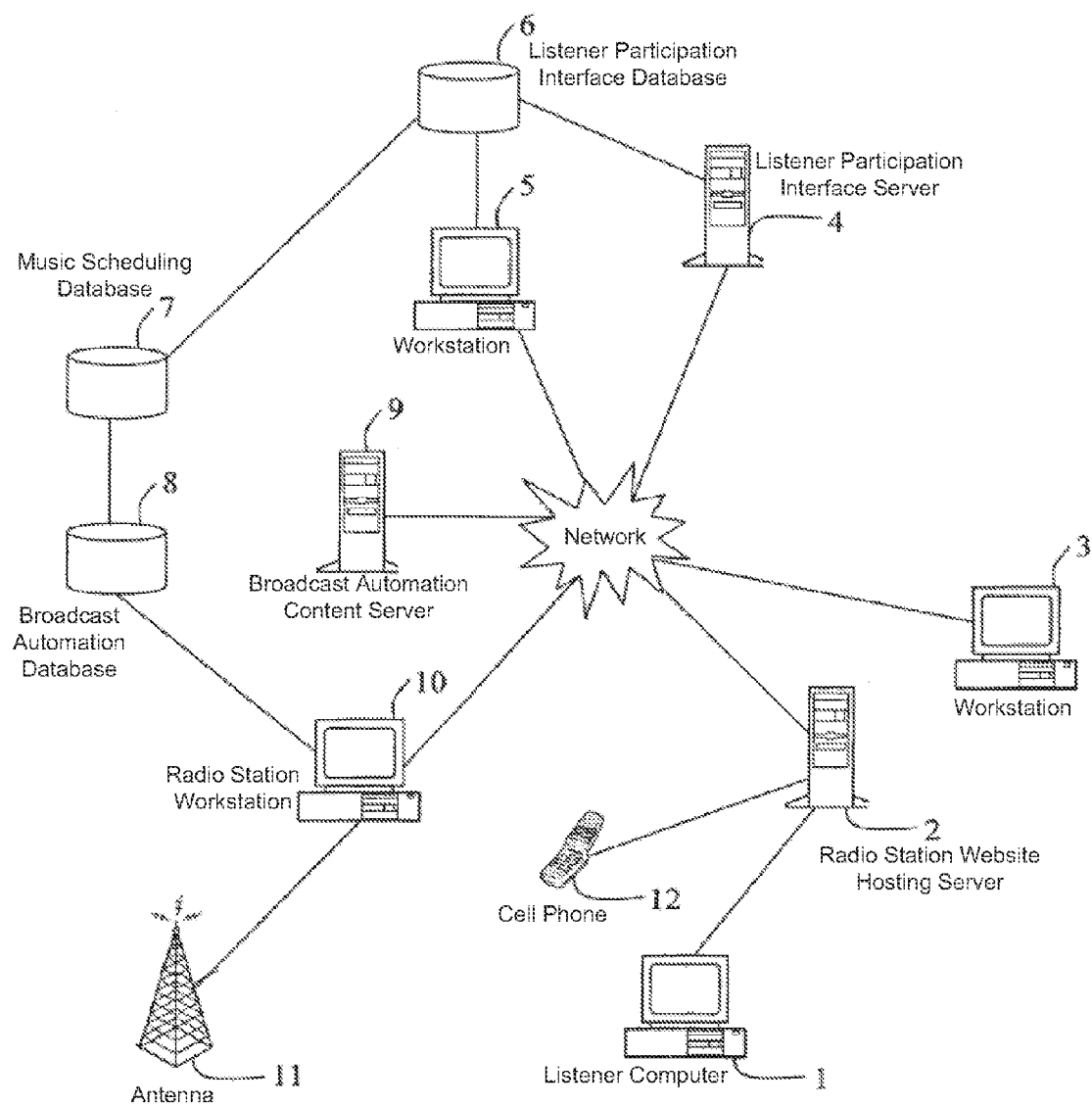
FIG. 1 is depicts an embodiment of a system that may be used for providing a listener participation interface.

In one embodiment, a system and method is described in connection with radio station broadcasting for providing a listener participation interface. Such a listener participation interface may be provided to allow listeners to organize media elements into a playlist and to facilitate the judging of playlists by listeners and/or by radio broadcasters. Those skilled in the art will appreciate that the system and method described herein may alternatively be provided in connection with television or other media broadcasting. Accordingly, a "listener" may refer to a consumer of audible media, visible media, data media, or some combination thereof, and may also refer to, e.g., more general users and to evaluators of such media.

In one embodiment, a listener participation interface may allow listeners to use the same or similar technology as that used by radio broadcasters to create playlists from media elements provided by a radio broadcaster, allow secure access to broadcast data or media elements stored on a radio broadcaster's database, and allow playlists to be judged in a contest by listeners and by radio broadcasters.

In one embodiment, once playlist finalists have been determined by the radio broadcaster, playlists may be imported into the broadcaster's broadcast scheduling computer and database for broad transmission, e.g., over-the-air or via the Internet. Listeners may then hear the playlists on the radio broadcast and have the opportunity through the listener participation interface to rate and judge the playlists. The timing and order of broadcasting listener playlists may be based on the playlist impact amongst the listeners who have submitted the playlists, as well as how the listener playlists pertain and relate to the other programming scheduled in the day. A broadcaster may examine when to best air playlists such that the playlists do not appear to repeat other listener playlists or the broadcaster's broadcast schedule. Historical data may be logged by the broadcaster's existing broadcast scheduling computer in order for future schedules to be based on what media elements were broadcast in listener playlists.

Radio broadcasters generally use playlist assembler software to create one or more playlists that may be incorporated into a given radio broadcast. Playlist assembler software may comprise computer instructions to assist in organizing a plurality of media elements to form a playlist for a given radio broadcast. For example, playlist assembler software may comprise the MusicGen® or GSelector® music scheduling software installed on a radio broadcasting station workstation. Those skilled in the art will appreciate that various embodiments of playlist assembler software may be used in connection with the system and method described herein. A media element may include, but is not limited to, a song, an advertisement, a radio host commentary, news, a segue, beds, a promotion, station identification, a traffic report, a time or temperature announcement, a sound effect, a show, and the like, and may include metadata associated with those media elements, such as artist, title, track and the like. Some embodiments of playlist assembler software may provide a segue editor that a listener may use to define the relationship between media elements such as cross-fades and voice-overs. Those skilled in the art will appreciate that assembling media elements in other contexts, such as assembling video and text files, may include video elements, text and other visual events, as well.

A playlist is generally a time-based collection or arrangement of media elements organized in playback order. For example and not by limitation, a broadcaster may define, over a 24-hour period, when various media elements will be played to create the radio (or television, etc., as the case may be) broadcast "experience," as is known to those skilled in the art. A playlist may be planned and created well in advance of actual broadcast, or may be created or modified "on the fly." A playlist may also include metadata associated with the media elements, such as song title, artist, radio station identification, macros (listener-defined sequences of media elements) and the like. As noted above, playlist assembler software may allow the relationship or transition between media elements to be defined through use of a segue editor to provide a particular listening experience.

As shown in FIG. 1, one embodiment of a system and method of providing a listener participation interface may include a radio station workstation 10 running radio broadcast automation software, e.g., the NexGen Digital® broadcast automation suite from Prophet Systems Inc. or Master Control™ studio automation software from RCS, Inc., that relies on a broadcast automation content server 9 for broadcast program content and on a broadcast automation database 8 for broadcast program schedule data such as media elements. The radio station workstation 10 may broadcast a radio program over the air via antenna 11 or transmit the program to a radio station website hosting server 2 for transmission, such as by streaming or downloading, to a listener computer 1 and/or cell phone 12 or other mobile device. Optionally, a website hosting administrator may manage the radio station website hosting server 2 via workstation 3. The radio station workstation 10 may further rely on music scheduling database 7 to supply music scheduling data for the radio program schedule. A listener may use a listener computer 1 to access a radio station's website at radio station website hosting server 2. Generally, a listener may listen to that radio station's broadcast either over the air (if within the broadcast range of antenna 11) or via network transmission, e.g., the Internet. Those having skill in the art will recognize that a broadcaster may operate multiple radio stations and may thus broadcast multiple media streams.

In one embodiment, a listener may interact with the radio broadcaster. A listener participation interface server 4 may provide a listener participation graphical user interface (GUI) to the radio station website hosting server 2 for access by the listener through listener computer 1. The GUI may be populated with media elements retrieved from a listener participation interface database 6. An administrator may manage the listener participation interface server 4 and listener participation interface database 6 via workstation 5. Alternatively, the system may include one or more listener participation interface servers 4 and one or more listener participation interface databases 6. The listener participation interface server 4 and listener participation interface database 6 may provide a more secure "layer" between a broadcaster's computer system and one or more listeners. A broadcaster's computer system may comprise, in this embodiment, radio station workstation 10, broadcast automation content server 9, broadcast automation content database 8 and music scheduling database 7, all of which may be located at a single location or at multiple locations. As such, a broadcaster may protect any proprietary or confidential information and its systems of operation while still allowing one or more listeners to have access to certain media elements, playlists or software programs, including but not limited to listener participation software or playlist assembler software. Generally, a database includes, but is not limited to, a collection of data embodied in at least one computer readable medium and organized in a suitable way to permit a computer to select one or more desired pieces of such data. For instance, listener participation interface database 6 may comprise a Structured Query Language (SQL) database or a Microsoft® Access database. Of course, other suitable databases may be employed. The computers, workstations and servers include but are not limited to programmable machines capable of executing machine-readable instructions. The computers, workstations and servers may comprise one or more processors, which may comprise part of a single machine or multiple machines.

Each of listener participation interface server 4 and listener participation interface database 6 may comprise one or more units of hardware, which may or may not be located at the same geographic location. Listener participation interface database 6, which may be integral to or separate from listener participation interface server 4, may serve as a searchable repository for a large volume of media elements. Listener participation interface database 6 and listener participation interface server 4 may be accessible by one or more radio personnel, such as through workstations 10 or 5, and one or more listeners through a network, which may include but is not limited to the Internet. Indeed, those skilled in the art will recognize that communication between the devices illustrated in FIG. 1 may be direct or indirect, wireless or otherwise, and through any suitable network, such as the Internet. Those skilled in the art will recognize that a listener may communicate with the radio station website hosting server via any suitable electronic device, including mobile devices such as cellular phones 12 and PDAs. Listener participation interface server 4 may be programmed with one or more computer programs containing instructions for receiving input signals representative of media elements, storing the media elements in listener participation interface database 6, and providing or restricting access to media elements or listener participation software to one or more listeners, one or more radio broadcast personnel, or any other users.

In various embodiments, a radio broadcaster or radio station may create a contest by selecting a plurality of media elements available for incorporation into playlists by listeners and populating a listener participation interface database 6 with the selected media elements. For example, a listener participation interface database 6 may be populated with media elements chosen from media elements stored in the music scheduling database 7. Also, listeners may create and submit media elements and playlists by utilizing a listener participation interface.

In some embodiments, at least one listener participation interface server 4 alone or in combination with at least one listener participation interface database 6 may serve to host a listener participation interface for a plurality of radio stations located at various geographic locations. Such a configuration would allow a radio station to incorporate a listener participation interface into the radio station's existing website without requiring additional computers or databases to be added to the radio station's existing computer system. In various embodiments, listener participation interface database 6 may populate media elements into a listener participation interface, and maintain the listener participation interface, voting, and analysis tools for tallying votes for various playlists or analysis of data for promotions or accounting purposes.

Broadcast automation content server 9 may be programmed with instructions to export media elements from broadcast automation database 8 to listener participation interface server 4 and in turn to listener participation interface database 6. A broadcaster may selectively determine which media elements or playlists may populate listener participation interface database 6. Broadcaster or radio station personnel may use an interface may be provided via radio station workstation 10 to build a library of media elements on listener participation interface database 6 that may be later accessed by one or more listeners. A radio broadcaster may periodically update the media elements on listener participation interface database 6.

Media elements may be organized in various ways, such as by topic, music genre or by length of time. Also, media elements may be tagged with identifying metadata that allows a query to be employed to search for a certain type of media element on listener participation interface database 6. For instance, media elements that comprise songs may be tagged as "country" or "rock" and a query could be run to retrieve all country or all rock song media elements. When media elements are exported from broadcast automation content server 9, metadata associated with those media elements may also be exported, such as but not limited to metadata identifying artist, title, length, sound code, tempo, and core score.

Each of broadcast automation content server 9 and broadcast automation database 8 may comprise one or more units of hardware, which may be located at the same geographic location. Broadcast automation database 8, which may be integral to or separate from broadcast automation content server 9, may serve as a searchable repository for a large volume of media elements. Broadcast automation database 8 may be a relational database or any other suitable type of database. Broadcast automation content server 9 may be programmed with instructions, such as but not limited to playlist assembler software, for organizing media elements into one or more playlists and organizing one or more playlists in order to generate a radio broadcast that may be transmitted via broadcast antenna 11. Broadcast automation content server 9 may also contain sufficient storage for maintaining a broadcast automation database 8.

A broadcast antenna 11 may or may not be located at the same geographic location as broadcast automation content database 8 and broadcast automation content server 9. Broadcast automation content server 9 may be accessible by one or more radio broadcast personnel through a workstation 10 that may communicate with broadcast automation content server 9 through a network, e.g., the Internet. One or more radio broadcast personnel may generate a playlist or radio broadcast via workstation 10. A wide variety of media elements may be stored on broadcast automation content database 8 and may be accessible by radio broadcast personnel at one or more geographic locations.

Listener participation interface server 4 may be programmed with instructions to permit (or not) access by one or more listeners, radio broadcast personnel or other users to certain portions of media elements on listener participation interface database 6 and to permit (or not) access to various software, including but not limited to listener participation software, that may be run on broadcast automation content server 9 or listener participation interface server 4. Listener participation software may comprise computer-readable instructions for providing a listener participation GUI accessible over a network that allows media elements to be arranged into a playlist and for providing a listener participation GUI that allows playlists to be viewed, listened to and judged as part of a contest. In some embodiments, the instructions in listener participation software that allow media elements to be organized into a playlist may be similar to instructions provided by playlist assembler software typically used by a broadcaster. In some embodiments, playlists that are created by using the exemplary listener participation software may be automatically compatible with, and may be incorporated into an actual radio broadcast by a broadcaster's broadcast automation software. Listener participation software may provide a listener participation GUI for display on a listener computer 1 via a network, e.g., the Internet. Alternatively, listener participation software may display a GUI on any other suitable computer or electronic device, such as but not limited to a cell phone, PDA, or hand-held computer. Listener participation software may be provided as an interactive web-based application. Alternatively, such listener participation software may be distributed, for example, on CD or via internet download.

Data to be stored in the listener participation interface database 6 may include registration information of one or more listeners. For example, if a listener requests a password, or some other authorization key, to be able to access a listener participation interface, listener participation interface server 4 may be programmed with instructions to require certain particular listener participation data to be entered, such as legal name, screen name, home or mailing address, age, telephone number, e-mail address, and other information concerning the listener. Some or all of this listener registration data may be stored in listener participation interface database 6 and automatically associated with certain media elements, or with playlists related to that listener, without the need for the listener to re-enter the listener registration data each time one or more playlists or media elements are uploaded from listener computer 1 to listener participation interface database 6. For example, whenever a listener logs on to listener participation interface server 4, any media element or playlist transmitted to listener participation interface server 4 may be tagged or identified with the listener's registration data in listener participation interface database 6.

In some embodiments of the listener participation interface, listeners may register for a playlist contest, wherein other listeners, and/or radio broadcast personnel may provide feedback regarding the playlists submitted for the contest. Feedback may include but is not limited to judging playlists against playlists submitted by other listeners. In this embodiment, the listener participation interface server 4 may be programmed with listener participation software that may comprise instructions for allowing access to playlists that have been submitted for contest to radio broadcast personnel through broadcast automation content server 9, and/or workstation 10. Depending on how the listener participation interface server 4 is programmed, a listener may need to install a client application on a listener computer 1 in order to access a listener participation interface. Alternatively, as noted above, a listener participation interface may be provided via a network "cloud," e.g., as a web-based application, such that no client application need be installed locally on a listener computer 1. Those skilled in the art will recognize that other connections between devices (including connections not shown in the figures) may be provided as suitable for implementing various embodiments described herein.

Figure 2:
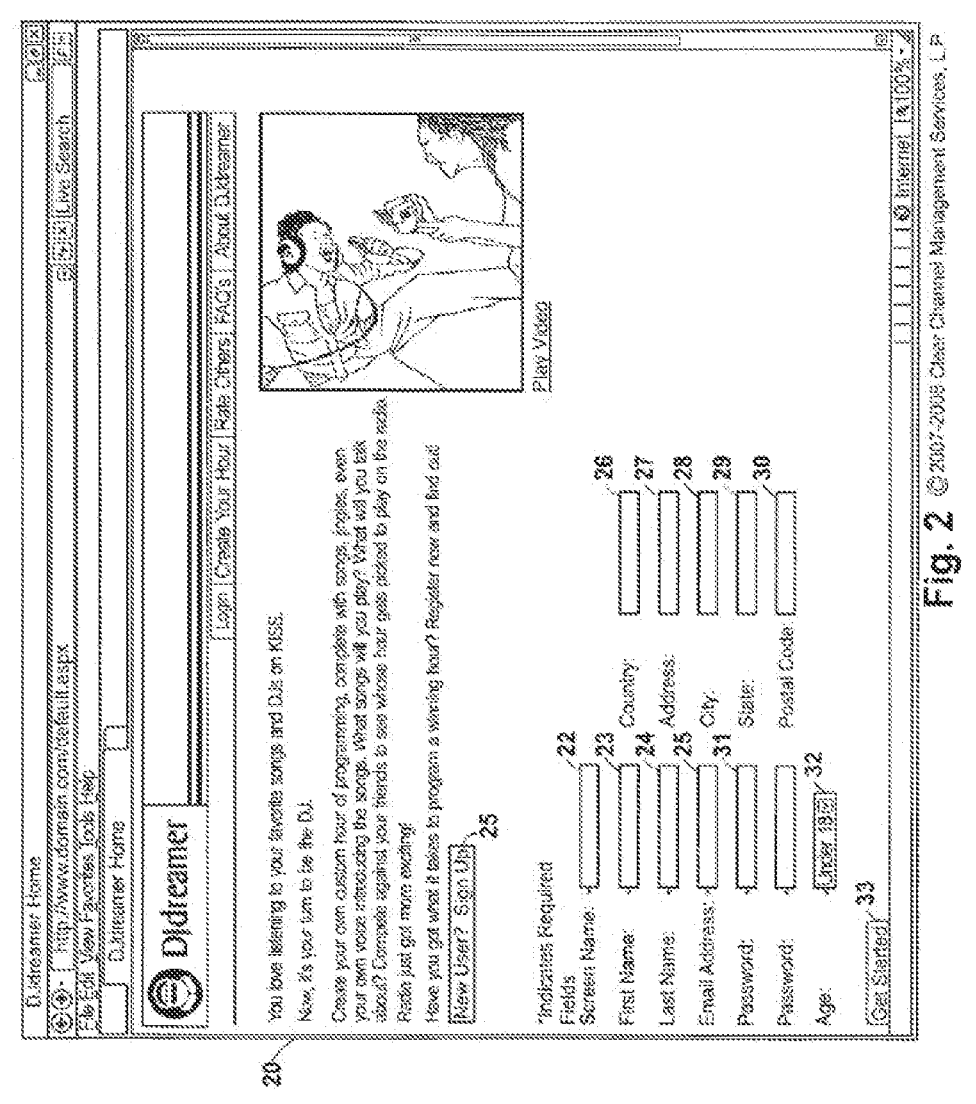

A listener participation interface may provide access to a listener through one or more listener participation GUI screens. For example, FIG. 2 illustrates one embodiment of a registration or sign-up screen 20 may be provided by the exemplary listener participation software to allow a listener to register for a playlist contest. The sign-up screen 20 may be initiated by clicking on a New User button 21. In the exemplary sign-up screen 20, a variety of listener registration data may be entered into various registration fields, such as a screen name in field 22, first name in field 23, last name in field 24, address in field 27, city in field 28, state in field 29, postal code in field 30, country in field 26, e-mail address in field 25, age as may be selected from a drop-down menu 32, and password in fields 31. After entering information into the registration fields, the listener may select a Get Started button 33 in order to complete the registration process with listener participation interface server 4. Once a listener has registered, the listener participation interface server 4 may be programmed with instructions to generate a specific key associated with that listener's screen name and password. In addition, after a listener has registered, the listener may log in so as to gain access to information, including but not limited to media elements or playlists, through the listener participation interface by way of exemplary log-in screen 40, as shown in FIG. 3.

Figure 3:
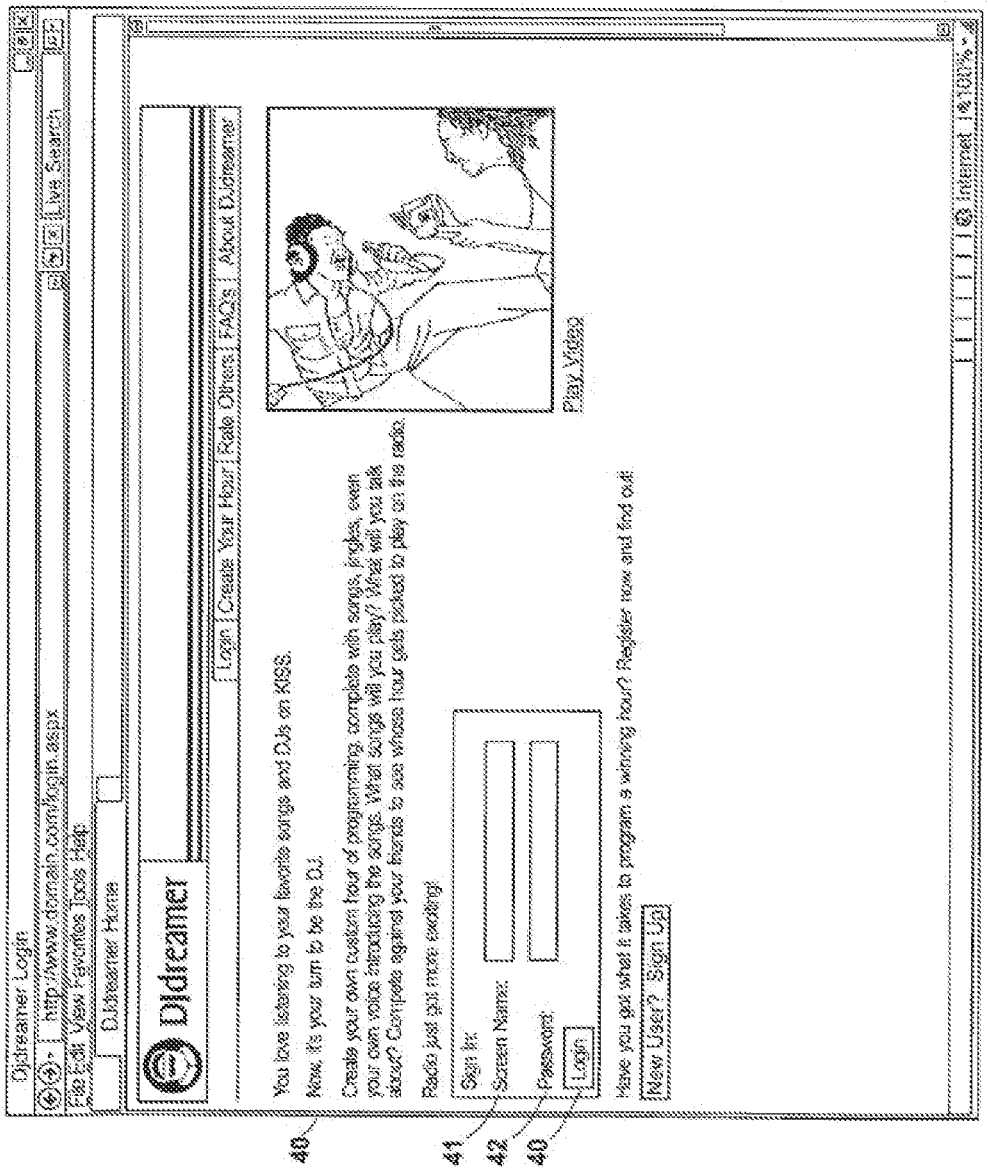
FIG. 3 depicts an embodiment of an interface for a listener to log into a listener participation interface that may be provided by the exemplary listener participation software.

In the embodiment of FIG. 3, a listener may log in by entering a screen name in field 41 and password in field 42 and clicking the Log-In button 43. After the log in process is completed, the listener participation interface server 4 may retrieve a key specific to that listener. Of course, other suitable ways of establishing listener authorization through the listener participation interface may be used.

As mentioned above, in some embodiments a listener may log into the listener participation interface in order to create a playlist using media elements. Listener participation software may provide instructions for allowing a listener to define the relationship between media elements similar to playlist assembler software utilized by radio broadcasters.

Figure 4:
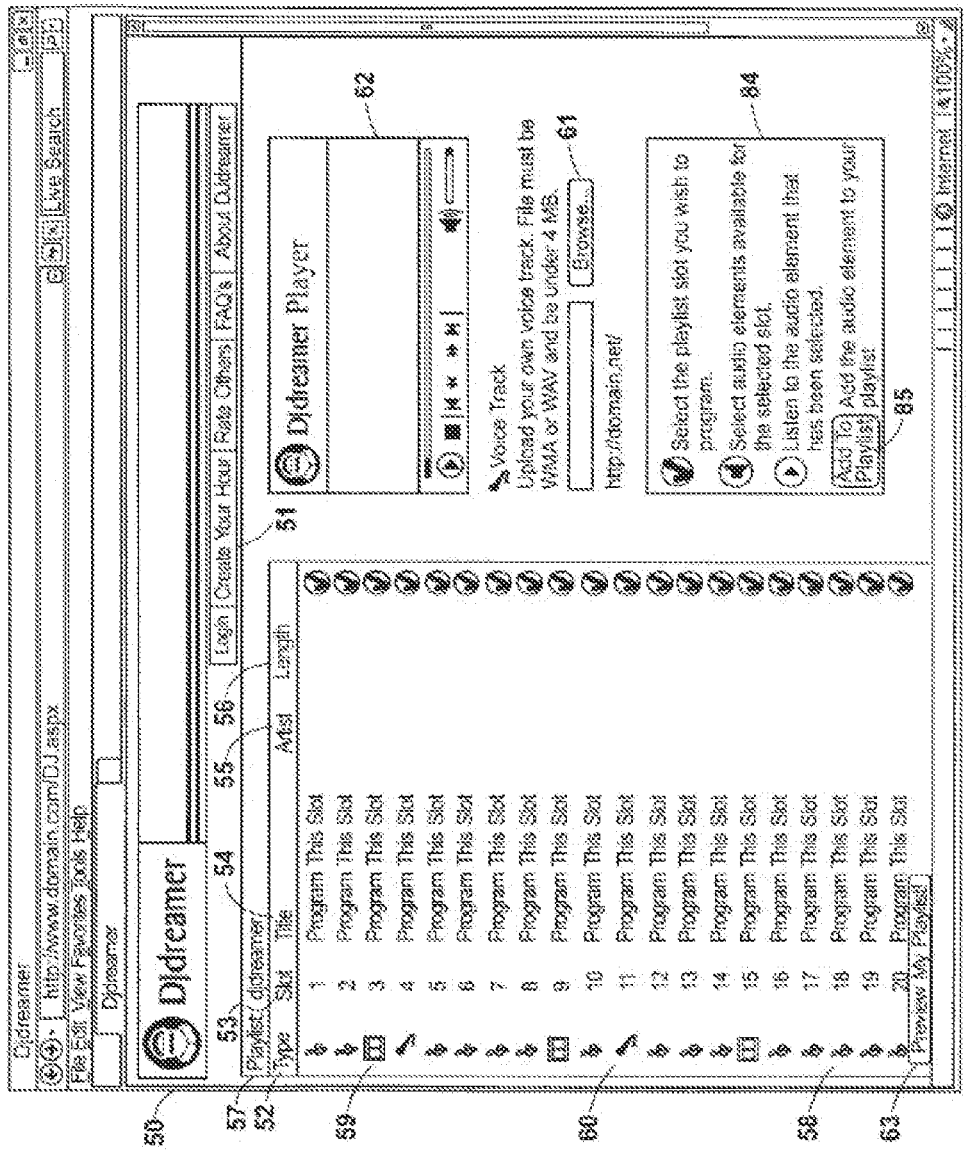
FIG. 4 is an embodiment of an interface for defining and creating a playlist of media elements that may be provided by the exemplary listener participation software.

FIG. 4 illustrates an exemplary Create Your Playlist screen 50 that a listener may use in order to organize or assemble media elements into a playlist, that may be provided by exemplary listener participation software. A Create Your Playlist screen 50 may appear in connection with a Create Your Hour tab 51. A playlist table 52 may contain one or more columns 57, 53, 54, 55, and 56, to identify various aspects of media elements in the slots (numbered 1-20 in the screen) of column 53 that make up a playlist. These aspects, such as whether the element is a song, advertisement, etc., the artist (column 55), duration (column 56) or volume of the media element, or any other identifying characteristic may be associated with the media element as metadata and stored accordingly in listener participation interface server 4 or listener participation interface database 6. A listener may select a slot in column 53 to insert a media element for a playlist. A media element may be inserted into one or more of the slots in the Create Your Playlist screen 50 shown in FIG. 4. The type of media element in a slot may be indicated in column 57 of table 52. For example, music may be represented by a symbol 58, a commercial may be represented by another symbol 59, and an audio voice track may be represented by yet another symbol 60. Of course, other symbols or representations may be used to identify other types of media elements.

In one embodiment, when a listener first opens the Create Your Playlist screen 50, no media elements may have been entered into or displayed in table 52. For example, all slots may initially indicate in title column 54 the words "Program This Slot" or some similar words to indicate that media elements may be inserted into the slots. A slot 53 may be selected and filled with a media element in any order by selecting that particular slot. A media element may be uploaded from listener computer 1 and incorporated into a playlist. In some embodiments, a media element uploaded from a listener computer 1 may be stored on listener participation interface database 6. In this embodiment, a listener may use the record options 61 to record, and the media player 62 to playback their own voice as a media element, such that the listener may emulate a radio disc jockey, and arrange the recorded voice track in conjunction with songs and other media elements to create a playlist "broadcast experience." This embodiment may allow a listener that may be interested in a career as a disk jockey to gain experience as a disc jockey or create a demo that may be used as a hiring or talent search tool for radio broadcasters to identify new talent for disc jockey positions. Alternatively, a listener may create or write scripts for a professional disc jockey to read, the recording of which may be incorporated as a media element into a playlist. Such an embodiment may facilitate the continuity of the radio station's identity during the airing of playlists that listeners have created.

Figure 5:
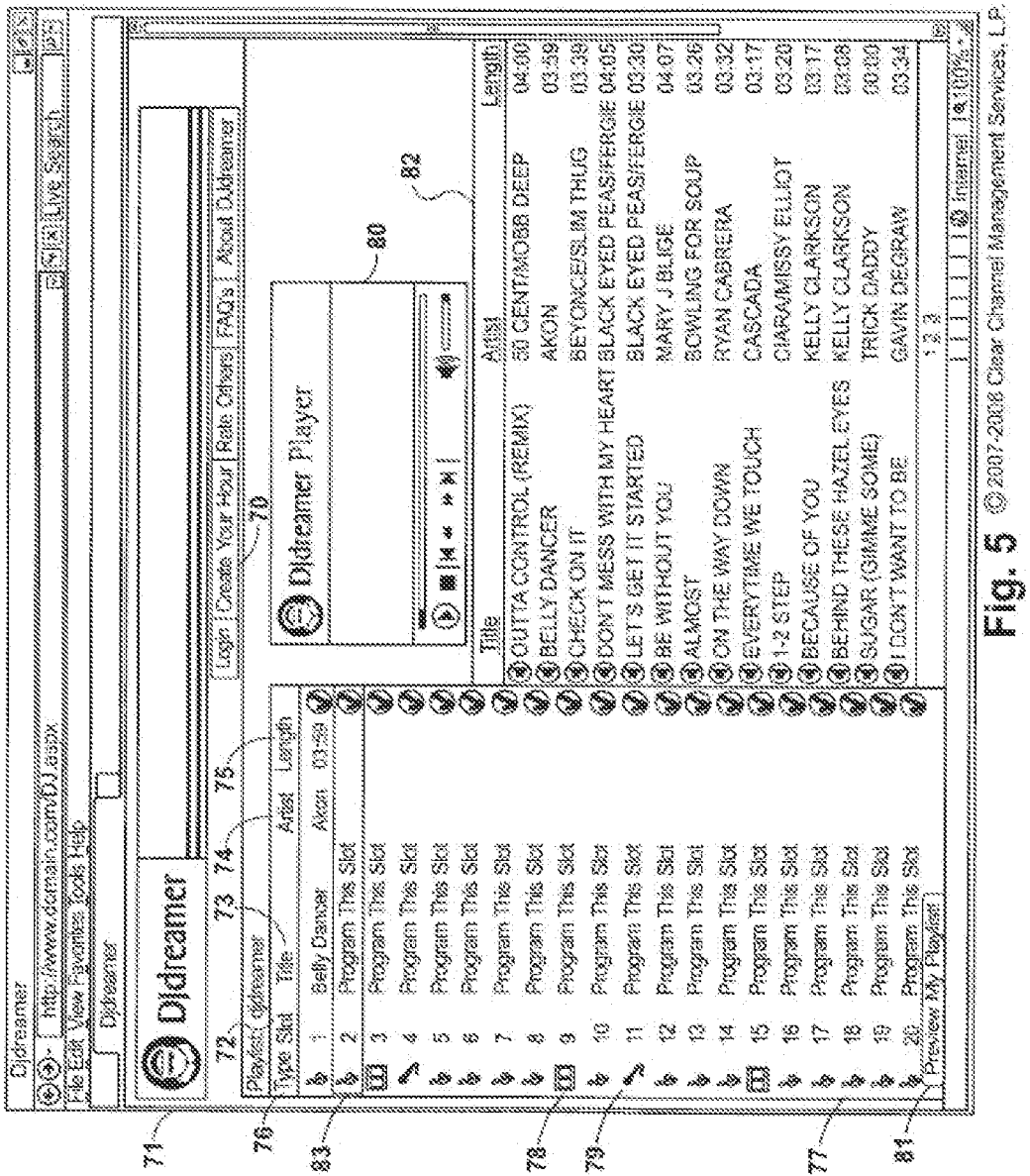
FIG. 5 is an embodiment of an interface having a selection of media elements that may be assembled into a playlist which may be provided by the exemplary listener participation software.

FIG. 5 depicts an exemplary interface having a selection of media elements that may be assembled into a playlist that may be provided by the exemplary listener participation software. Media elements may be selected from the list of media elements 82. Any media element in the list of media elements 82 may be previewed by use of a media player 80. In this embodiment, a listener may listen to a media element before choosing to incorporate that media element into a playlist. A slot in column 72 in playlist table 71, such as slot 83 (slot number 2 in the GUI), may be selected and a media element may be inserted by selecting the media element from a list of media elements 82 and then clicking a Add To Playlist button 85. In some embodiments, instructions for how to assemble a playlist may be provided in text box 84. In some embodiments, a listener may preview or listen to the playlist at any point during the process of assembling or creating a playlist by clicking on a Preview My Playlist button 81.

Figure 6:
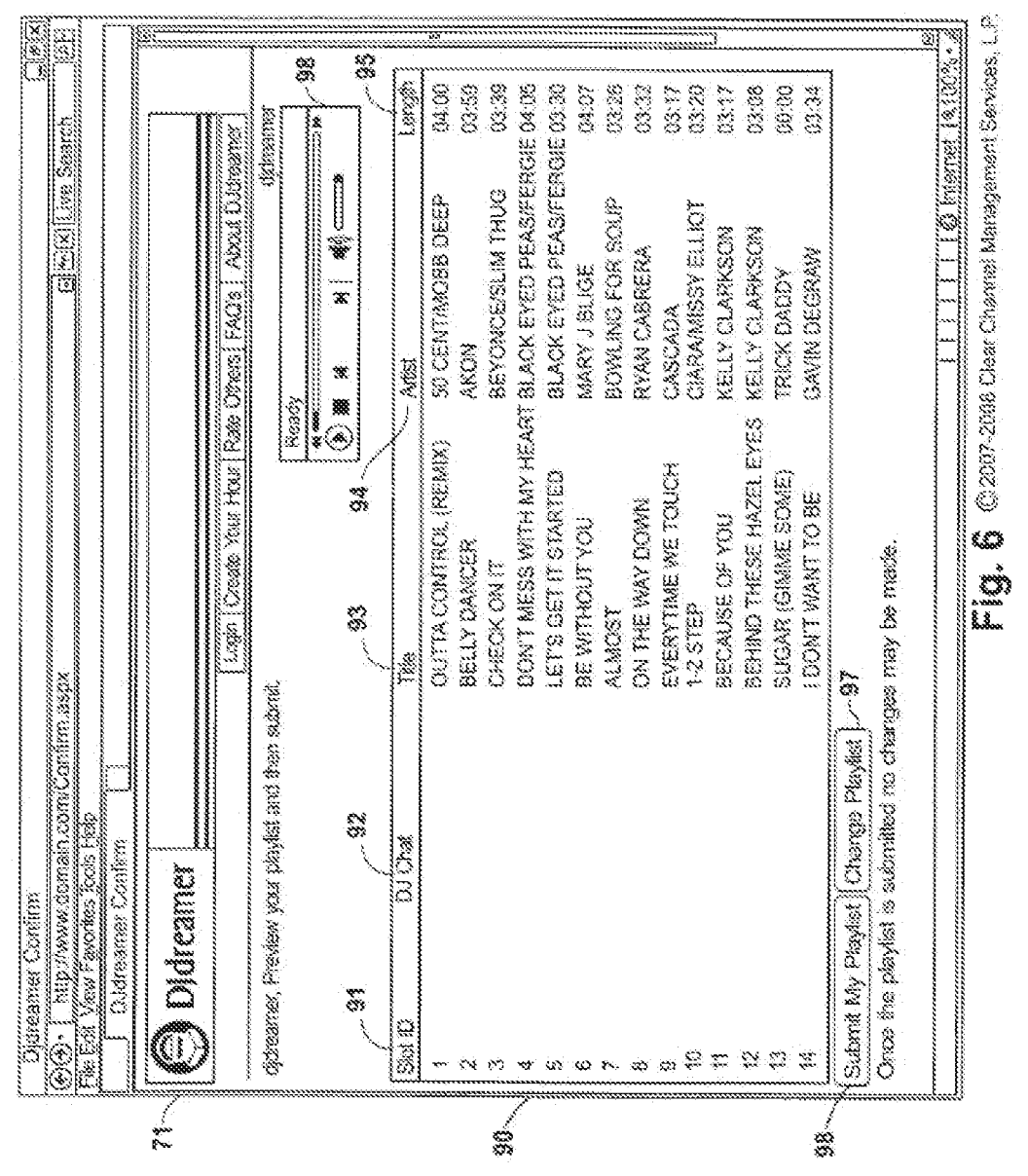

FIG. 6 depicts an exemplary screen of a playlist preview instantiated by clicking on the Preview My Playlist button 81 shown in FIG. 5. The playlist may be displayed on table 90, showing for each media element columns for the slot number 91, DJ chat 92, title 93, artist or author of the media element 94, and the length 95 of the media element. In one embodiment, a listener participation interface may provide a media player 96 that the listener may use to play the playlist or any media element in the playlist. A listener may go back to the interface of FIG. 5 by clicking on the Change Playlist button 97. In various embodiments, the listener may submit a playlist for a contest or to a broadcaster for an audition by clicking on the Submit My Playlist button 98.

Once a playlist has been defined and tagged, the media elements selected from the listener participation interface database 6 and arranged into a playlist may be merged into a single composite file using the transitional information contained in the metadata. The file may be stored on the listener participation interface database 6, or any other suitable database, and may be associated with the listener that created the playlist. The listener participation interface server 4 and listener participation interface database 6 may transmit listener-submitted playlists to broadcast automation content server 9 or to a broadcaster's or radio station's computer system. Such a playlist may be incorporated into a radio broadcast using typical broadcast scheduling software. In some embodiments, metadata exported with media elements may allow playlists to be seamlessly incorporated into and used with the scheduling software of the radio station because the media elements may be automatically compatible with such software.

Figure 7:
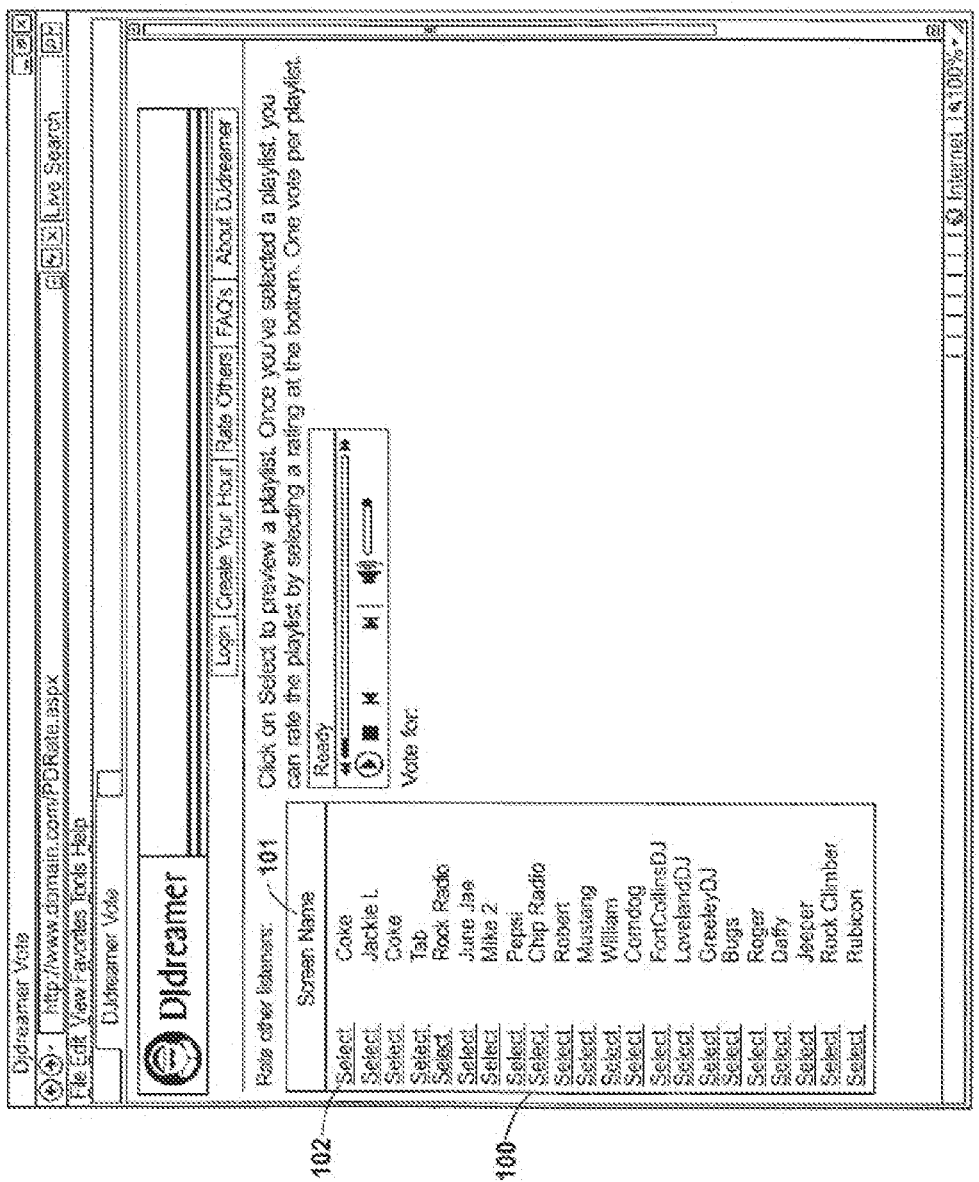
FIG. 7 depicts one embodiment of an interface that may be provided by the exemplary listener participation software for viewing and listening to a playlist that may be rated.

FIG. 7 depicts an exemplary interface that may allow a listener to rate one or more playlists created and submitted by other listeners. A selection of playlists 100 may be available to be previewed and listed according to the screen name 101 of the listener that created each playlist and selected by clicking on the Select hyperlink 102 located to the left of the screen name of the listener that created the playlist.

Figure 8:
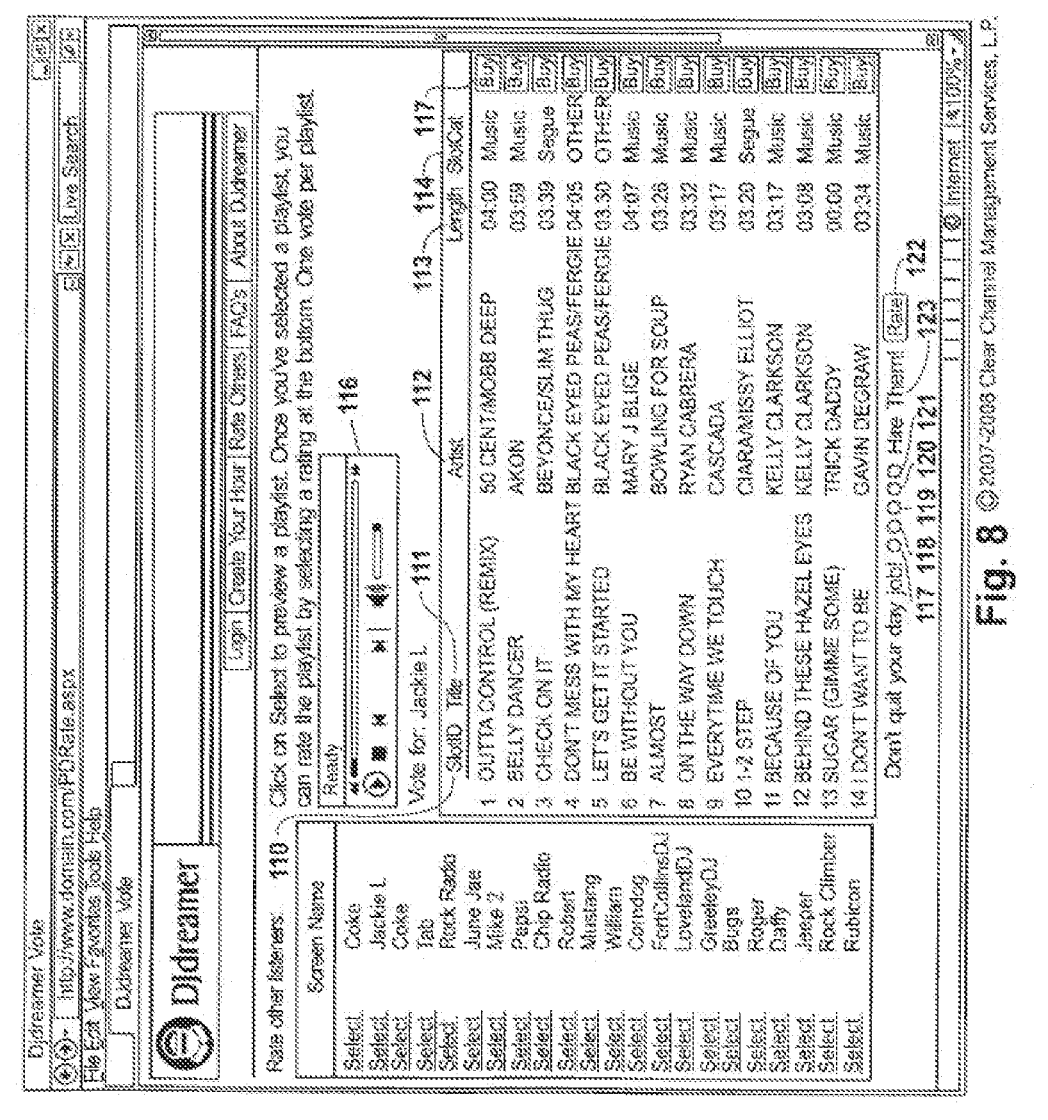

Referring to FIGS. 7 and 8, when a particular playlist is selected, the specific details of that playlist may be depicted (as shown in FIG. 8) in an exemplary table 115 with columns displaying information pertaining to the media elements, such as the slot number 110, the title 111, the artist 112, the length of the media element 113, or the category 114. Using a media player 116, a listener may listen to the playlist depicted in table 115 either by individually listening to each media element or listening to the media elements as arranged in the playlist. A feedback system 123 may be provided that allows a listener to, for example, rate the playlist on a scale of 1-5 ranging from, e.g., "Don't quit your day job!" to "Hire Them!" A listener may click on one of the buttons 117, 118, 119, 120, or 121 along that scale, and then click the Rate button 122 to submit the rating. Of course, various other embodiments may be provided that allow for playlists to be judged or rated on various other scales such as, but not limited to, ranking playlists by number against other playlists or various other scaling methods. When a listener submits a rating by clicking on the Rate button 122, that rating may be saved and submitted to the listener participation interface database 6. In some embodiments, listener participation software may provide instructions for organizing the ratings submitted by listeners or analyzing ratings that have been submitted in order to determine one or more winners or losers.

FIG. 9 depicts an exemplary interface for providing answers to frequently asked questions regarding a playlist contest. Such a listing of answers may appear under a separate tab 56, and may enable a listener participation interface, including a playlist contest, to be listener friendly or more easily navigated by a listener.

Figure 10:
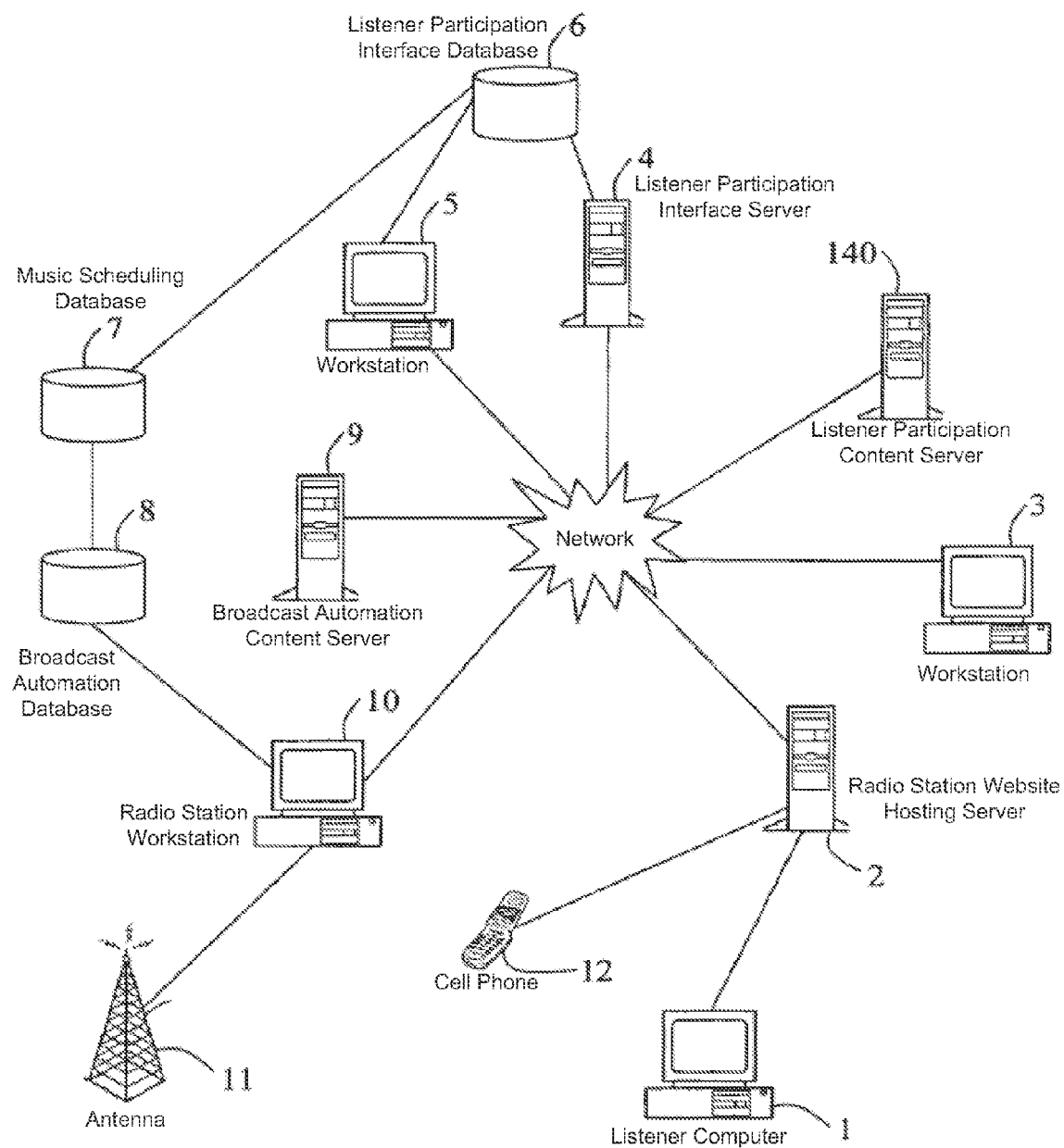
FIG. 10 is a schematic diagram of an alternative embodiment of a system that may provide a listener participation interface.

FIG. 10 depicts an alternative embodiment of a system and method of providing a listener participation interface. This embodiment includes the devices of FIG. 1, and further includes a listener participation content server 140. In this embodiment, broadcast automation server 9 may communicate a broad range of listener participation content to the listener participation content server 140 to populate the listener participation interface. As with FIG. 1, those skilled in the art will recognize that other connections between devices (including connections not shown in the figures) may be provided as suitable for implementing various embodiments described herein.

Figure 11:
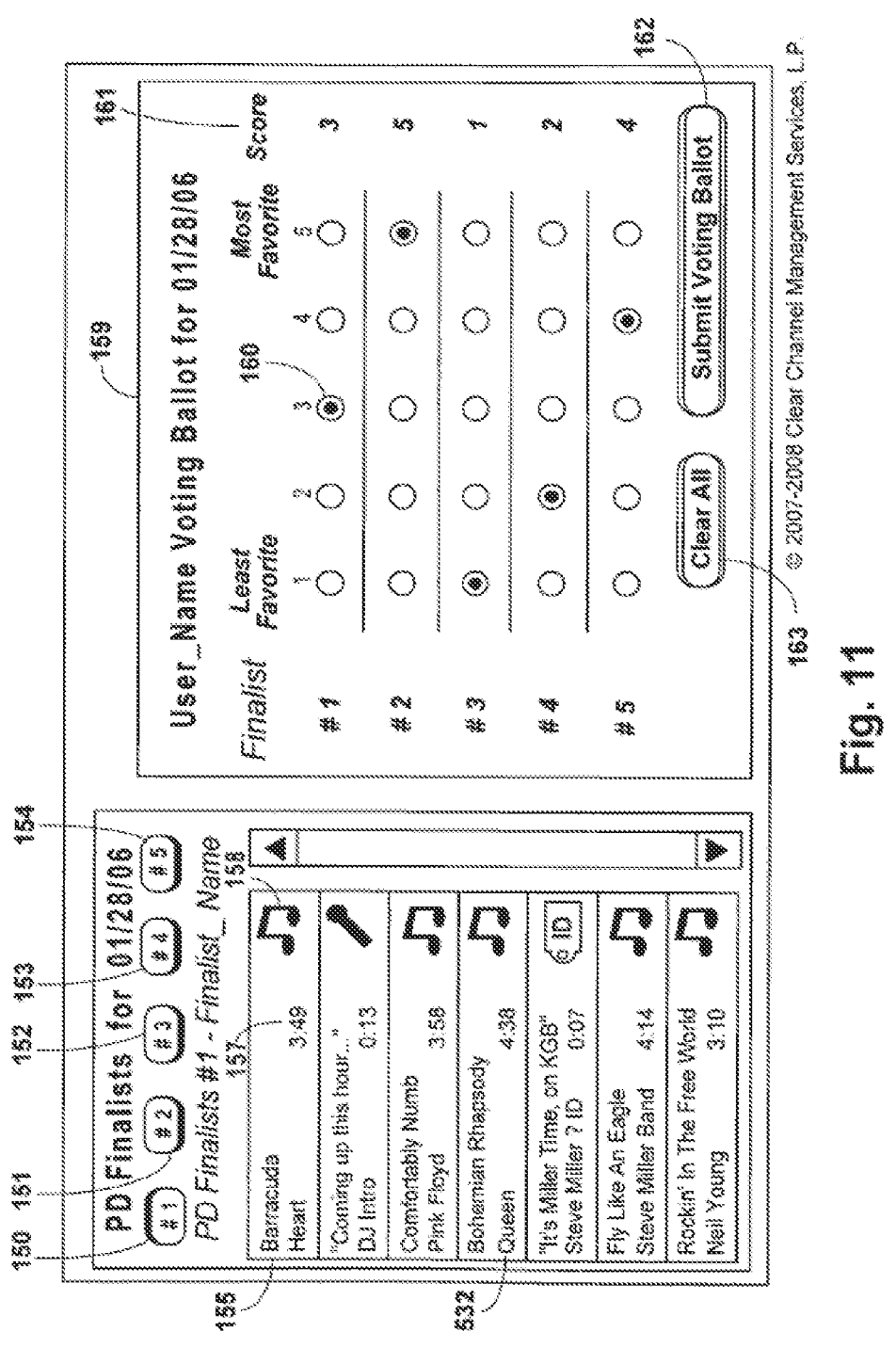

FIG. 11 depicts an exemplary interface that a listener may use to view, listen, and rate to a playlist. In this embodiment, the playlists identified by buttons 150, 151, 152, 153, or 154 may be the finalists that have received the highest rating as compared to a plurality of other playlists. A finalist playlist may be identified by one or more number buttons 150, 151, 152, 153, or 154. For instance, upon clicking on the "#1" button 150, the playlist associated with number 1 may be uploaded into window 155. In window 155, the media elements in the playlist may be identified by title 156, length 157, and type 158. A ballot 159 may be provided to rate finalists 1-5 by submitting a score by clicking on a button 160 that represents a rated score between least favorite or most favorite as compared between each of the finalist playlists. The score that has been selected may be shown in column 161. A ballot may be submitted by clicking on the Submit Voting Ballot button 162. Alternatively the rated selections may be cleared by clicking on the Clear All button 163.

FIG. 12 depicts another exemplary interface through which a listener may assemble a playlist. A selection of media elements 170 may be provided. A program log 171 may be provided as a template into which media elements may be inserted from a selection of media elements 170. To select a media element, a listener may click on that element and then click the Select button 172, which allows that media element to be inserted into the program log 171. A program log may be saved by clicking on a Save button 176. The selection of media elements 170 may be organized by title, artist, media element length or other identifying characteristics by clicking on the Title button 173, the Artist button 174, or the Time button 175. Other types of media elements may be selected from lists provided under the tabs "Station IDs," "Station Bits" and "Other." Such other types of media elements may include without limitation jingles, sound effects, station identification and such other elements.

FIG. 13 depicts another exemplary interface that a listener may interact with to rate a playlist that has been created and submitted by other listeners. A program log 180 may identify the media elements in the playlist and the playlist may be rated by clicking on buttons 181, 182, 183, 184, or 185 on a scale of 1-5. The ballot may be submitted by clicking on a Submit Voting Ballot button 186 or, alternatively, the ballot may be cleared by clicking on a Clear button 187.

Figure 14:
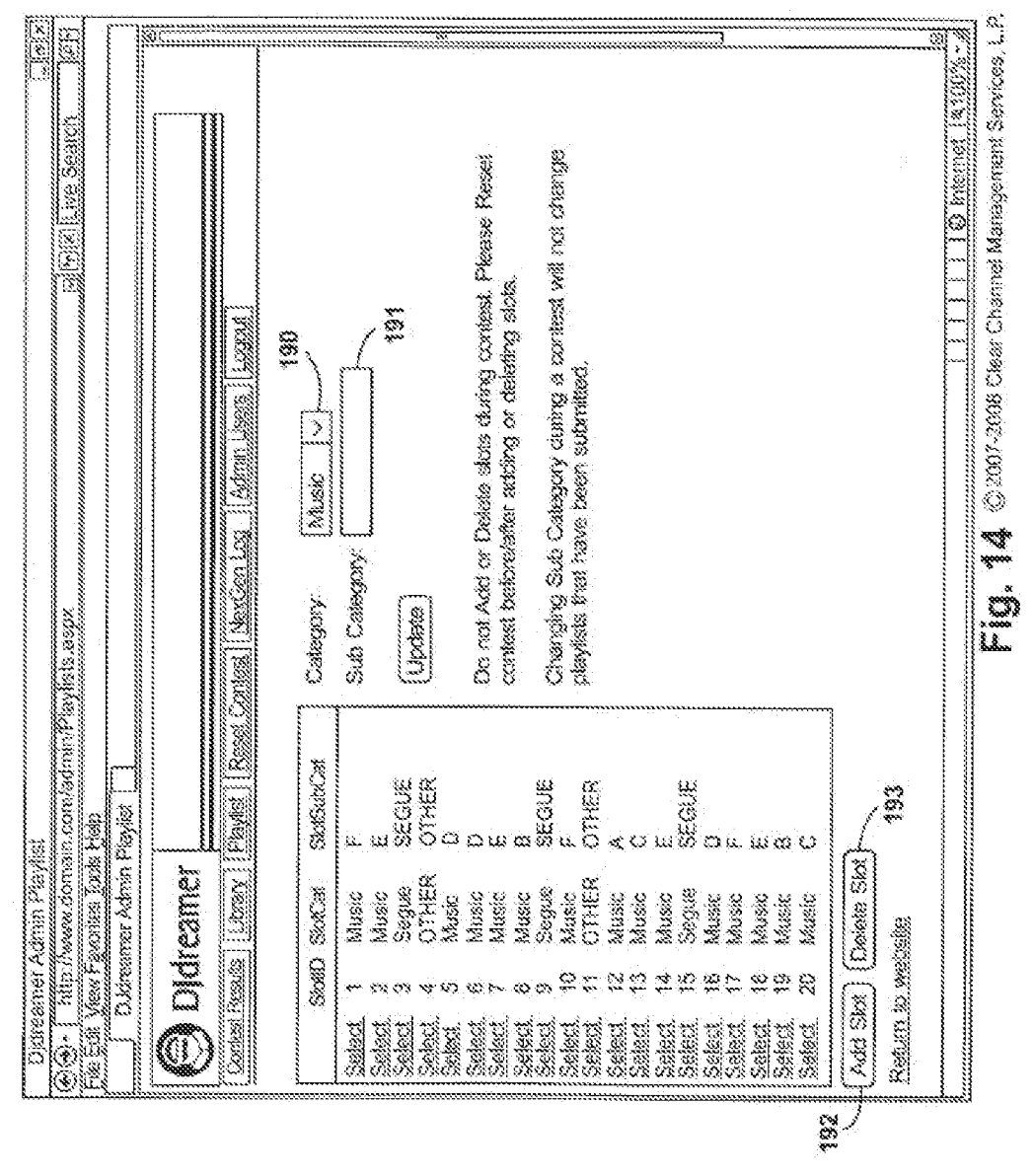

FIG. 14 depicts an exemplary interface that may allow a radio broadcaster to manage and edit a playlist such as a playlist submitted by a listener. Media elements may be selected from a listener participation interface database 6 or a broadcast automation content database 8 by category 190 or subcategory 191. For example, a playlist that has been submitted by a listener may be edited before incorporating the playlist into a radio broadcast such that it is more appropriate to a professional radio broadcast, such as by adding or deleting media elements. Slots may be added or deleted by clicking on Add Slot button 192 or Delete Slot button 193. In this embodiment, each slot has a category and a subcategory that may assist a broadcaster in editing the playlist.

Figure 15:
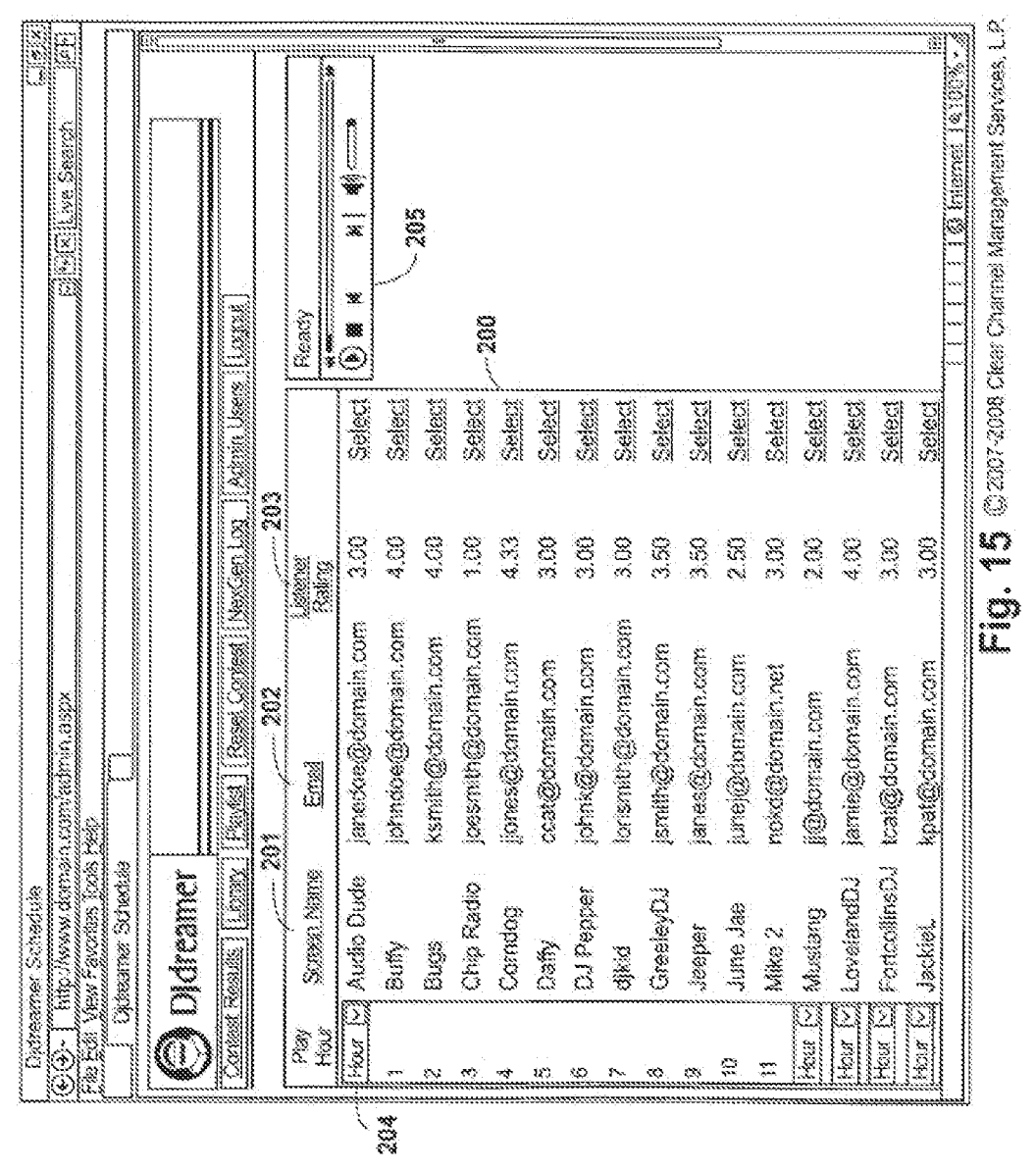

FIG. 15 depicts an exemplary interface that may allow a broadcaster to organize playlists submitted by listeners into a radio broadcast and coordinate such organization with, in some embodiments, broadcast automation software. Playlists may be depicted in playlist table 200 and identified by the screen name 201 and email address 202 of the listener that created the playlist. In some embodiments, the listener rating 203 may also be shown next to the screen name 201 and email address 202 of the listener that submitted the playlist. A playlist may be inserted into a particular time sequence of a radio broadcast by a drop down menu 204, which in this embodiment allows a broadcaster to select an hour of the day in which a playlist may be broadcast. A drop down menu similar to 204 may be available next to each playlist such that each playlist can be placed into a particular time sequence in a radio broadcast. A playlist may be previewed by use of media player 205.

Figure 16:
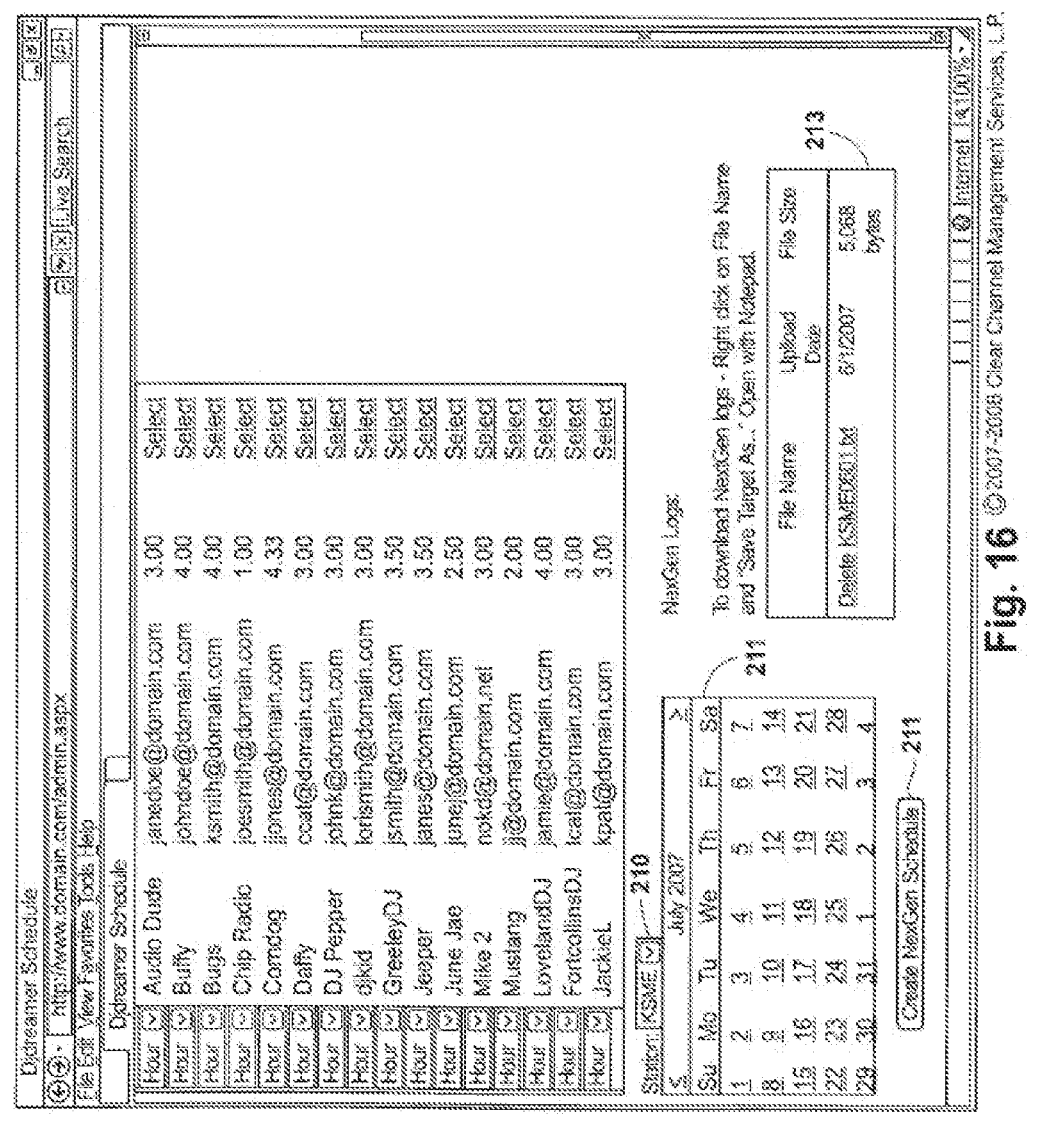

FIG. 16 depicts another portion of that exemplary interface of FIG. 15. As may be seen in FIG. 16, a broadcaster may select a broadcast station through a drop down menu 210 and a day on which a playlist may be incorporated through calendar 211, and submit the schedule by clicking on a Create NextGen Schedule button 212. Selecting the Create NextGen Schedule button 212 creates a time-based log that may be imported into a broadcaster's broadcast automation software such as NextGen to create a daily log. Such importation may be accomplished through use of links provided in table 213.

FIG. 17 depicts a time-based log 220 of media elements that has been downloaded to create the daily log by use of the links provided in table 213 of FIG. 16. Such a time-based log 220 may be displayed and printed in order to provide a summary of the media elements to be played in the radio broadcast and that have been incorporated using broadcast automation software.

Figure 18:
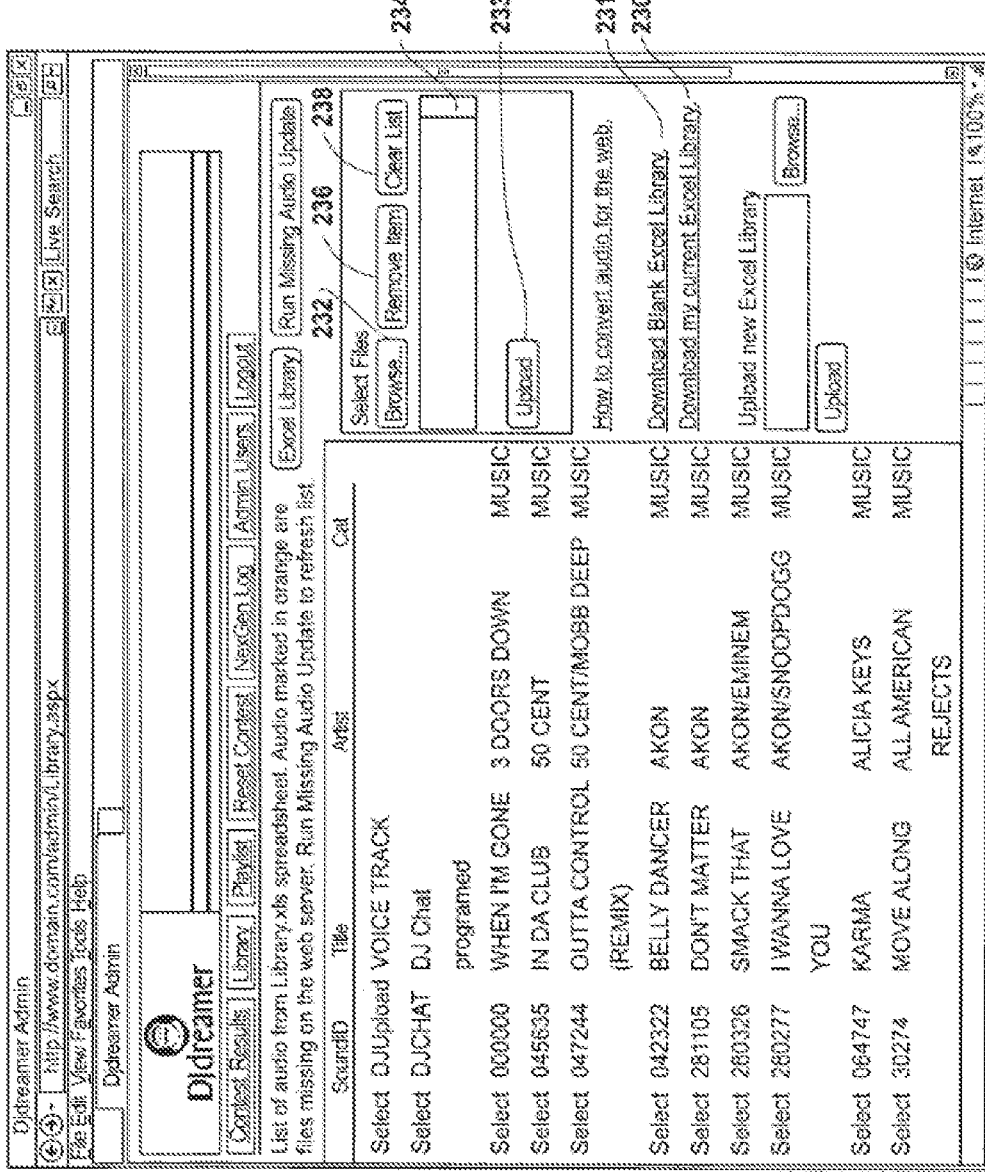
FIG. 18 depicts an interface that may be provided by the exemplary listener participation software for a radio broadcaster to manage and edit media elements that have been or will be populated onto a listener participation interface database.

FIG. 18 depicts an exemplary interface for a broadcaster to manage a library of media elements exported to the listener participation interface database 6. Media elements in listener participation interface database 6 may be downloaded and thus previewed in, for example, a Microsoft Excel® spreadsheet by clicking on Download My Current Excel Library link 230. A blank library that would enable a broadcaster to select media elements for exportation to the listener participation interface database 6 may be accessed via the Download Blank Excel Library link 231. Files may be selected and inserted into a blank Excel library by clicking on the Browse button 232 and the Upload button 233. One or more media elements may be inserted into field 234 by browsing the broadcaster's computer system, for instance a broadcast automation content database 8 and a broadcast automation content server 9, and selecting the media element to insert into field 234. An item may be removed by clicking on a Remove Item button 236 and the list may be cleared by clicking on the Clear List button 238.

Figure 19:
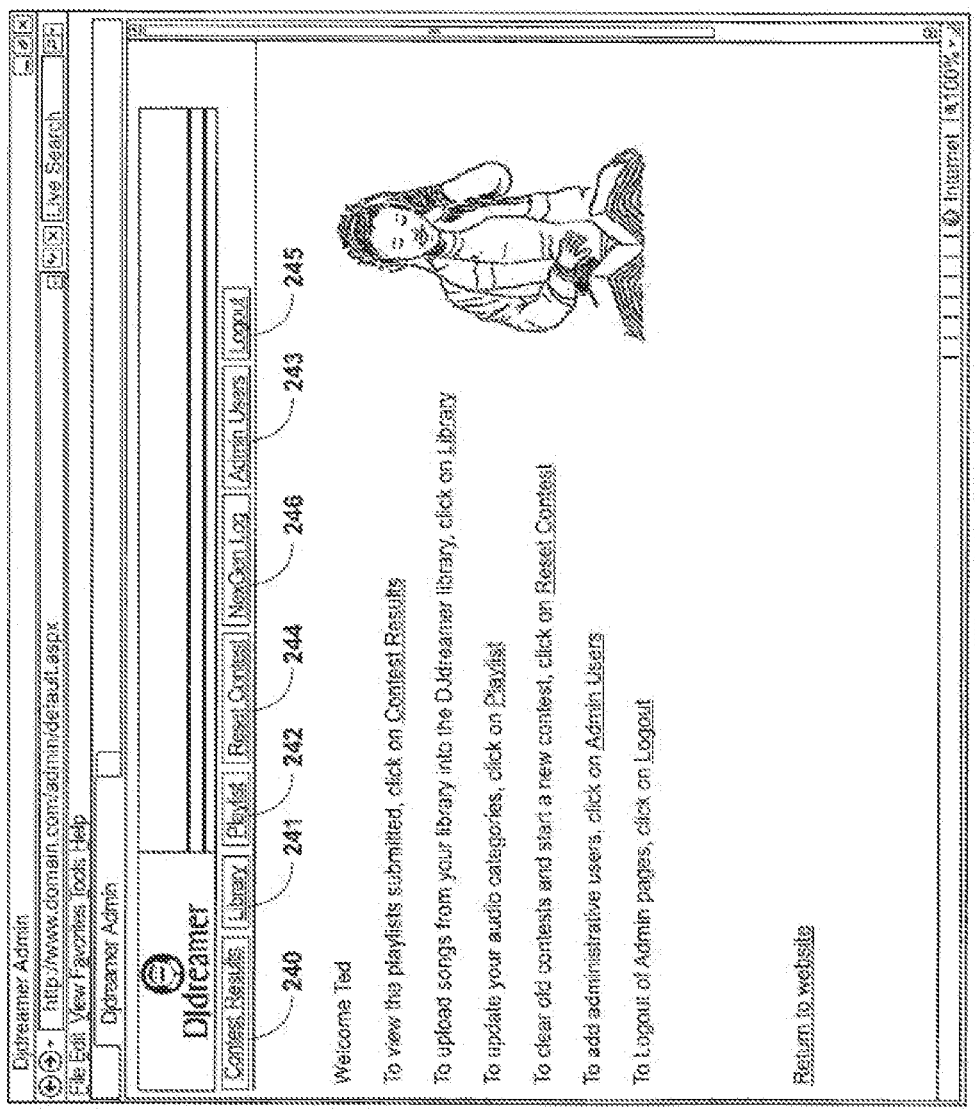
FIG. 19 depicts an interface that may be provided by the exemplary listener participation software for a radio broadcaster to create and manage one or more playlist contests.

FIG. 19 depicts an exemplary administrative interface that may allow a radio broadcaster to create and manage a custom playlist contest. For example and not by way of limitation, a broadcaster may review contest results by clicking on a Contest Results link 240. Playlists that have been submitted for a contest through a listener participation interface may be previewed by clicking on a Contest Results link 240. In some embodiments, clicking on a Contest Results link 240 may cause finalist playlists to appear for review. A broadcaster may export media elements to the listener participation interface database 6 by clicking on a Library link 241. A broadcaster may update the various audio categories associated with the media elements exported to listener participation interface database 6 by clicking on a Playlist link 242. A broadcaster may initiate a new contest by clicking on a Reset Contest link 244. A broadcaster may add other authorized radio broadcast personnel to have access to the listener participation interface by clicking on a Admin Users link 243. In some embodiments, the broadcaster may access the broadcast automation software log by clicking on a Next Gen Log link 246. A radio broadcaster may log out by clicking a Log Out link 245.

After a contest is over, the broadcaster may reset the listener participation interface by clearing previous voting records and playlists, and provide a new contest in the manner described above.

Figure 20:
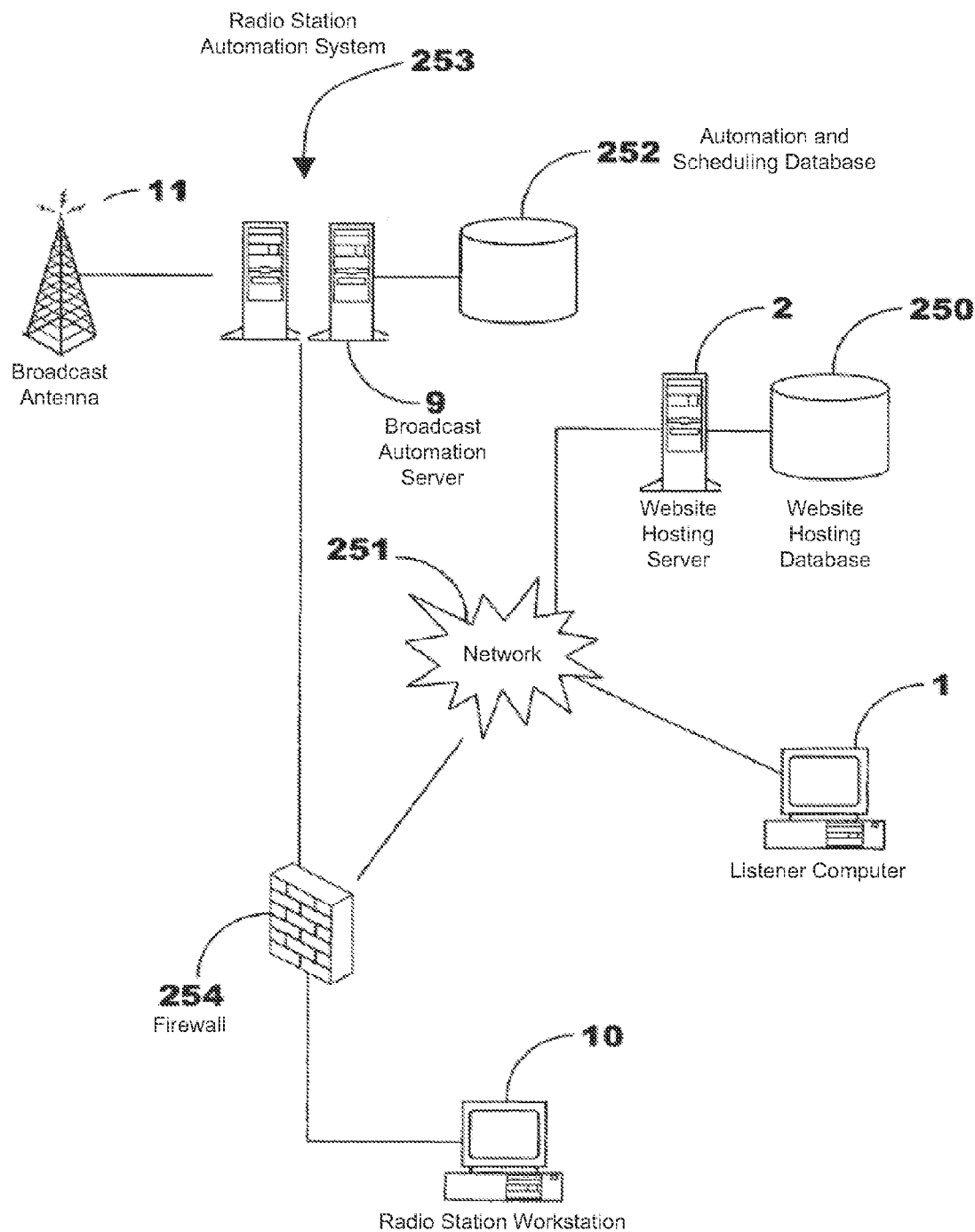
FIG. 20 is a schematic diagram of yet another alternative embodiment of a system that may provide a listener participation interface.

FIG. 20 depicts yet another alternative embodiment of a system and method of providing a listener participation interface. This embodiment is provides the listener participation interface through a much "leaner" system than that of FIG. 1, for example, yet does not limit the features and functionality of the listener participation interface and the listener and broadcaster's interaction therewith. In this embodiment, a radio station automation system 253 and a radio station workstation 10 may communicate with a website hosting server 2 and website hosting database 250, and a listener computer 1 over a network 251, such as the Internet. For added security, a firewall 254 may be used to shield the radio station automation system 253 and the radio station workstation 10 from network hazards. In this embodiment, the radio station automation system 253 includes a broadcast automation server 9 (shown in this embodiment as multiple servers), and an automation and scheduling database 252. In this embodiment, broadcast antenna 11 transmits broadcast signals over the air. A radio broadcaster may facilitate listener participation by populating the listener participation interface software residing at website hosting database 250 with media elements from automation and scheduling database 252. A listener may interact with the radio broadcaster through a GUI provided by website hosting server 2. Here, as well, those skilled in the art will recognize that other connections between devices (including connections not shown in the figures) may be provided as suitable for implementing various embodiments described herein.

In the embodiment of FIG. 20, a broadcaster at radio station workstation 10 may create a spreadsheet using, for example, Microsoft Excel, with a list of media elements to be loaded into the listener participation interface. As noted above, such media elements may include songs, bits, liners or other audio content. The broadcaster may then access the administrative section of the listener participation interface and upload the Excel spreadsheet to the listener participation interface at the website hosting database 250. The broadcaster may then download the listed media elements from the radio station automation system 253, convert the audio to an appropriate format such as WMA as may be necessary, and upload the media elements to the website hosting database 250. Those skilled in the art will appreciate that the broadcaster may alternatively cause the radio station automation system 253 to transmit media elements directly to the website hosting database 250. The broadcaster may then create exemplary playlists for the listener participation interface by logging in, and selecting and arranging the media elements.

Figure 21:
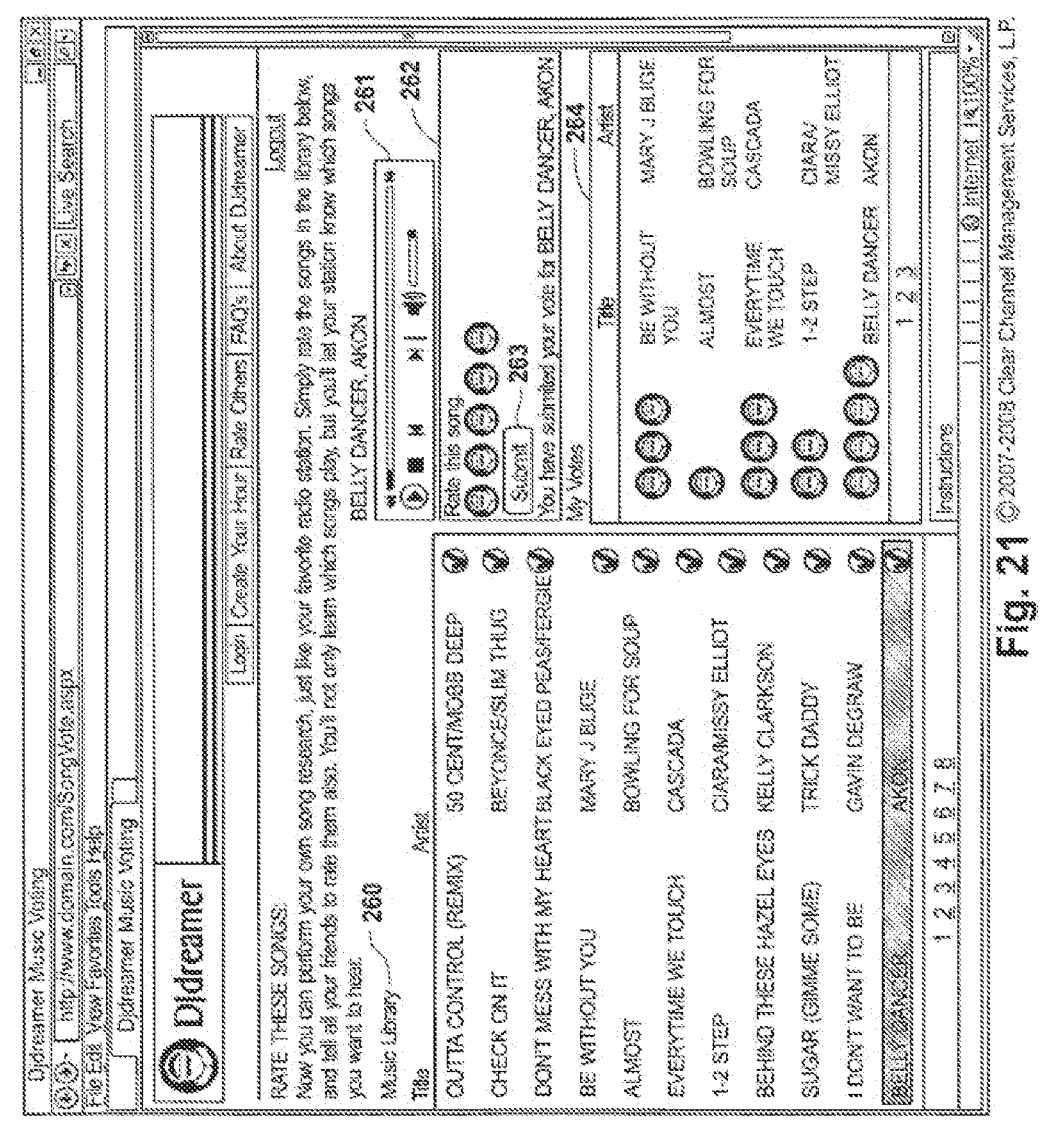

FIG. 21 depicts an exemplary interface that may be provided by the exemplary listener participation software for a listener to view, listen to, and rate media elements, including but not limited to a plurality of songs. In this embodiment, the interface may allow a listener to inform the radio broadcaster which songs the listener would like to have in a radio broadcast. One part of the interface, the Music Library 260, may provide a list of songs that may be rated by title and artist. Listeners may listen to and rate each song by clicking on that song in the Music Library 260. In some embodiments, a media player 261 may be provided and may automatically begin playing a song when a listener clicks on that song in the Music Library 260. A listener may rate a song using a ballot 262, and may submit the ballot 262 to the broadcaster by clicking on the Submit button 263. A listener that is logged into the listener participation interface may view all votes that a particular listener has submitted for songs in the My Votes table 264. A listener may change his or her vote for a song in the My Votes table 264 by selecting that song from the My Votes table 264.

A radio broadcaster may research the popularity of media elements, including but not limited to songs, and create a radio broadcast accordingly by using the results obtained through the interface of FIG. 21. The media elements that the radio broadcaster may allow to be rated by listeners may comprise the current media elements being played on air or new media elements the radio broadcaster is considering airing. As shown in FIG. 22, an exemplary interface may be provided by the exemplary listener participation software to allow a radio broadcaster to view and access the results from the ratings submitted by listeners. In the embodiment shown in FIG. 22, a radio broadcaster may view the average of all votes for a plurality of songs in column 271 and the total number of votes submitted for each song in column 272. The title of the song and the artist may be displayed in columns 273 and 274 respectively. Finally, a song identification number may be displayed in column 275. Of course, the results obtained from the interface of FIG. 21 may be displayed in various other formats.

A listener participation interface as described herein may provide a greater level of listener participation in a radio broadcast and thus increase the number of listeners for a radio broadcaster. There may be natural excitement and word of mouth publicity generated with respect to a radio broadcast or radio station if listeners tell their friends to listen and vote for their playlist. In some embodiments, a listener participation interface may provide a vehicle for new music and core music testing. Trends as to which media elements, such as music and jingles, are most commonly selected may allow a broadcaster or radio station to more selectively broadcast the most popular media elements.

Those skilled in the art will recognize that the various devices disclosed in FIGS. 1, 10 and 20 may communicate via network. A network may be any type of electronically connected group of computers including, for instance, the following networks: Internet, Intranet, Local Area Networks (LAN), Wide Area Networks (WAN) or an interconnected combination of these network types. In addition, the connectivity within a network may be, for example, remote modem, Ethernet (IEEE 802.3), Token Ring (IEEE 802.5), Fiber Distributed Datalink Interface (FDDI), Wi-Fi (IEEE 802.11), Wi-Max (IEEE 802.16), Asynchronous Transfer Mode (ATM), or any other communication protocol. Those having skill in the art will recognize that the devices in FIGS. 1, 10 and 20 may be any suitable device, such as a desktop computer, server, portable device, hand-held device, set-top box, personal digital assistant (PDA), a terminal, thin client, or a suitable device of any other desired type or configuration. Those having skill in the art will recognize that network-connected devices, and devices connected to each other, may vary widely in processing speed, internal memory, communication capability, and other performance aspects, as may be suitable for the various functionalities described herein. Such devices may also be geographically dispersed. Communications within the network and to or from the computing devices connected to the network or each other may be either wired or wireless, and may be established by physical, electronic, optical, or other means. Wireless communication may be especially advantageous for network connected portable or hand-held devices. A network may include, at least in part, the world-wide public Internet which generally connects a plurality of users in accordance with a client-server model in accordance with the transmission control protocol/internet protocol (TCP/IP) specification. A client-server network may provide a dominant model for communicating between two computing devices. Using this relationship, a client computer (a "client") may issue one or more commands to a server computer (the "server"). The server may fulfill client commands by accessing available network resources and returning information to the client pursuant to client commands During this process, client computer systems and network resources resident on the network servers may be assigned a network address for identification during communications between elements of the network. Communications from other network connected systems to the servers may include the network address of the relevant server/network resource as part of the communication so that the appropriate destination of the data/request may be identified as the recipient. If a network comprises the global Internet, the network address may be an IP address in the TCP/IP format which may, at least in part, route data to an e-mail account, a web-site, or other Internet tool resident on the server. Thus, information and services resident on the network servers may be available to the web browser of a client computer through a domain name which maps to the IP address of the network server.

Although the foregoing specific details describe certain embodiments of this invention, persons having ordinary skill in the art will recognize that various changes may be made in the details of this invention without departing from the spirit and scope of the invention as defined in the appended claims. Those having skill in the art will recognize that a variety of GUIs, devices and connections may be provided according to the principles described herein. Therefore, it should be understood that this invention is not to be limited to the specific details shown and described herein.

What is claimed is:

1. A method comprising:
by executing at least one program instruction on a computer:
providing a listener participation interface including an access control and a feedback control to at least one listener, the listener participation interface configured to present at least one playlist including a plurality of media elements included in a broadcast library to the at least one listener for judging;
in response to the at least one listener activating the access control, providing the at least one listener access to the at least one playlist, the at least one playlist being a candidate playlist for broadcast;
receiving feedback, via the feedback control, from the at least one listener, the feedback indicating a judgment of the at least one listener indicating whether the at least one candidate playlist for broadcast should be broadcast;

evaluating the feedback from the at least one listener to identify a selected one of a plurality of candidate playlists for broadcast at a pre-designated time; and broadcasting at substantially the pre-designated time the selected one of the plurality of candidate playlists indicated by the feedback received from the at least one listener.

2. The method of claim 1, further comprising, by executing another at least one program instruction on the computer:

receiving changed feedback, via the feedback control, from the at least one listener, the changed feedback from the at least one listener indicating a changed judgment of the at least one listener related to whether the candidate playlist for broadcast should be broadcast.

3. The method of claim 2, the feedback control configured to:

modify the candidate playlist for broadcast based on the changed feedback received by the at least one listener.

4. The method of claim 1, the listener participation interface comprising a media player that automatically plays at least one of the plurality of media elements of which the at least one playlist is comprised when the candidate playlist for broadcast is accessed by the at least one listener.

5. The method of claim 1, wherein the at least one listener includes a plurality of listeners.

6. The method of claim 5 further comprising, by executing another at least one program instruction on the computer:

receiving statistical information associated with feedback from the plurality of listeners.

7. The method of claim 6, wherein the statistical information indicates an average of at least a portion of the feedback from the plurality of listeners.

8. The method of claim 1, wherein at least one of the plurality of media elements of which the candidate playlist is comprised is currently being played on air.

9. The method of claim 1, further comprising, by executing another at least one program instruction on the computer:

receiving the candidate playlist for broadcast from a different listener prior to providing access to the candidate playlist for broadcast.

10. A non-transitory computer readable medium tangibly embodying a program of computer executable instructions, the program of computer executable instructions comprising:

at least one instruction to provide a listener participation interface including an access control and a feedback control to at least one listener, the listener participation interface configured to present at least one playlist including a plurality of media elements included in a broadcast library to the at least one listener for judging;

at least one instruction to, in response to the at least one listener activating the access control, provide the listener access to the at least one playlist, the at least one playlist being a candidate playlist for broadcast;

at least one instruction to receive feedback, via the feedback control, from the at least one listener, the feedback indicating a judgment of the at least one listener indicating whether the at least one candidate playlist for broadcast should be broadcast;

at least one instruction to evaluate the feedback from the at least one listener to identify a selected one of a plurality of candidate playlists for broadcast at a pre-designated time; and at least one instruction to broadcast the selected one of the plurality of candidate playlists at substantially the pre-designated time indicated by the feedback received from at least one listener.

11. The non-transitory computer readable medium of claim 10, the program of computer executable instructions comprising:

at least one instruction to receive changed feedback, via the feedback control, from the listener, the changed feedback from the listener indicating a changed judgment of the at least one listener related to whether the candidate playlist for broadcast should be broadcast.

12. The non-transitory computer readable medium of claim 11, the feedback control configured to:

modify the candidate playlist for broadcast based on the changed feedback received by the at least one listener.

13. The non-transitory computer readable medium of claim 10, wherein the listener participation interface including a media player that automatically plays at least one of the plurality of media elements of which the at least one playlist is comprised when the candidate playlist for broadcast is accessed by the at least one listener.

14. The non-transitory computer readable medium of claim 10, wherein the at least one listener includes a plurality of listeners.

15. The non-transitory computer readable medium of claim 14, the program of computer executable instructions further comprising at least one instruction to receive statistical information associated with feedback from the plurality of listeners.

16. The non-transitory computer readable medium of claim 15, wherein the statistical information indicating an average of at least a portion of the feedback from the plurality of listeners.

17. The non-transitory computer readable medium of claim 10, wherein at least one instruction to create the broadcast based on the feedback received from the at least one listener comprising at least one instruction to create a broadcast playlist.

18. The non-transitory computer readable medium of claim 10, wherein at least one of the plurality of media elements of which the candidate playlist is comprised is currently being played on air.

19. A device comprising:

a memory; and a processor communicatively coupled to the memory, the processor configured to:

provide a listener participation interface including an access control and a feedback control to at least one listener, the listener participation interface configured to present at least one playlist including a plurality of media elements included in a broadcast library to the at least one listener for judging;

in response to the at least one listener activating the access control, provide the at least one listener access to the at least one playlist, the at least one playlist being a candidate playlist for broadcast;

receive feedback, via the feedback control, from the at least one listener, the feedback indicating a judgment of the at least one listener indicating whether the at least one candidate playlist for broadcast should be broadcast;

evaluate the feedback from the at least one listener to identify a selected one of a plurality of candidate playlists for broadcast at a pre-designated time; and broadcast the selected one of the plurality of candidate playlists at substantially the pre-designated time based on the judgment of the at least one listener indicated by the feedback.

20. The device of claim 19, the processor further configured to:

receive changed feedback, via the feedback control, from the at least one listener, the changed feedback from the at least one listener indicating a changed judgment of the at least one listener related to whether the candidate playlist for broadcast should be broadcast.

21. The device of claim 20, the feedback control further configured to:
modify the candidate playlist for broadcast based on the changed feedback received by the at least one listener.

22. The device of claim 19, wherein the at least one listener includes a plurality of listeners.

23. The device of claim 22, further comprising receiving statistical information associated with feedback from the plurality of listeners.

24. The device of claim 23, wherein the statistical information indicating an average of at least a portion of the feedback from the plurality of listeners.

25. The device of claim 19, wherein at least one of the plurality of media elements included with the candidate playlist is currently being played on air.

26. The device of claim 19, further comprising
receiving the candidate playlist from a different listener prior to providing access to the candidate playlist.

* * * * *